United States Patent [19]

Tanaka

[11] Patent Number: 5,502,948
[45] Date of Patent: Apr. 2, 1996

[54] GOODS COLLECTION METHOD AND APPARATUS

[75] Inventor: Nobuhiro Tanaka, Saitama, Japan

[73] Assignee: Kao Corporation, Tokyo, Japan

[21] Appl. No.: 237,007

[22] Filed: May 2, 1994

[30] Foreign Application Priority Data

May 6, 1993 [JP] Japan .................... 5-127764

[51] Int. Cl.⁶ .................. B65B 5/06; B65B 35/50; B65G 61/00
[52] U.S. Cl. .................. 53/447; 53/252; 53/474; 53/537
[58] Field of Search .................. 53/540, 537, 538, 53/447, 443, 245, 251, 252, 250, 260, 473, 474, 475

[56] References Cited

U.S. PATENT DOCUMENTS

| | | | |
|---|---|---|---|
| 2,738,116 | 3/1956 | Barraclough | 53/537 X |
| 2,886,929 | 5/1959 | Villemont | 53/251 X |
| 3,206,041 | 9/1965 | McGrath | |
| 4,114,351 | 9/1978 | Morimoto et al. | 53/537 X |
| 4,194,865 | 3/1980 | Bandoh | 53/537 X |
| 4,329,831 | 5/1982 | Warkentin et al. | 53/537 |
| 4,829,749 | 5/1989 | Hiyama et al. | 53/538 |

FOREIGN PATENT DOCUMENTS

| | | |
|---|---|---|
| 0183074 | 6/1986 | European Pat. Off. . |
| 0254261 | 1/1988 | European Pat. Off. . |
| 3172230 | 7/1991 | Japan . |
| 1127001 | 9/1968 | United Kingdom . |
| 1464245 | 2/1977 | United Kingdom ........ 53/538 |

Primary Examiner—James F. Coan
Attorney, Agent, or Firm—Dvorak and Traub

[57] ABSTRACT

A goods collection method is disclosed, in which box-shaped goods form goods delivery units and are successively received in necessary quantities on goods receptacles and accommodated in containers or the like. Each goods receptacle used has a goods reception surface inclined downward from a goods reception side toward the other side and includes a stopper wall provided on the other side for stopping received goods. The goods received on the goods receptacle are caused to gather on the goods reception surface such as to be on the side thereof adjacent the stopper wall.

6 Claims, 17 Drawing Sheets

F I G. 5
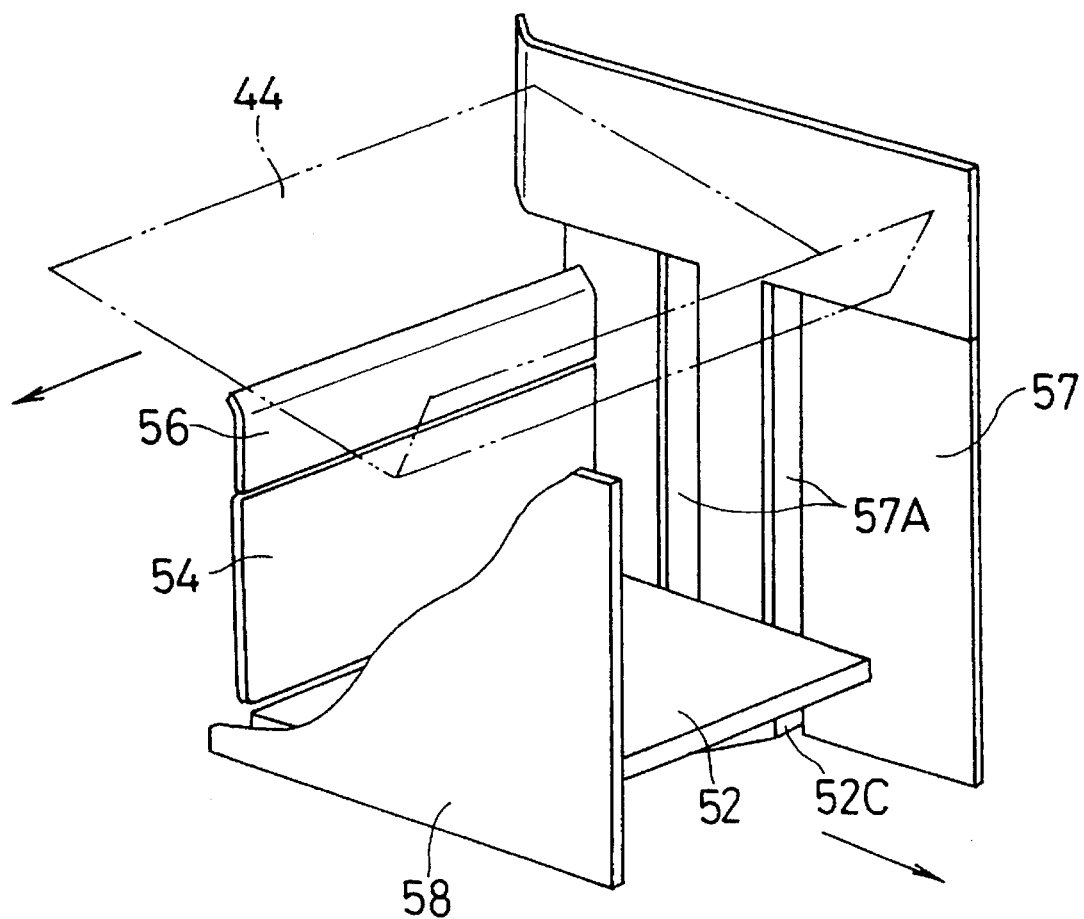

FIG. 6A
FIG. 6B
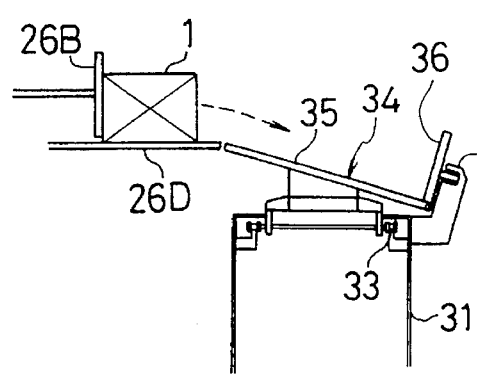
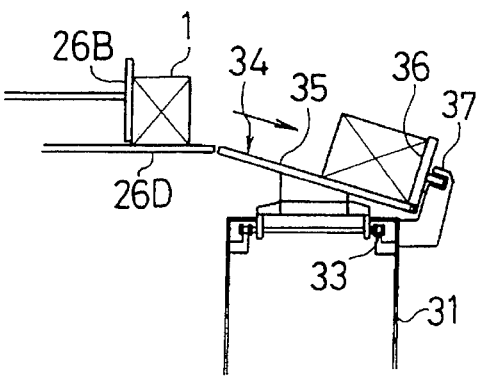
FIG. 7A
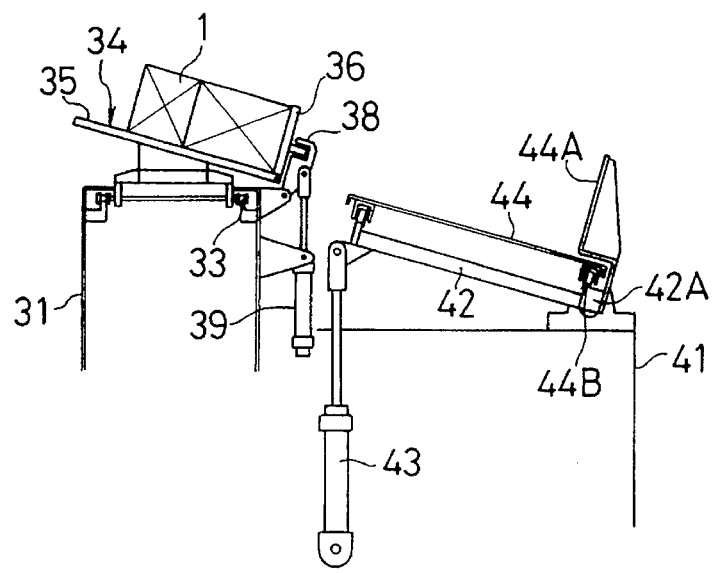
FIG. 7B
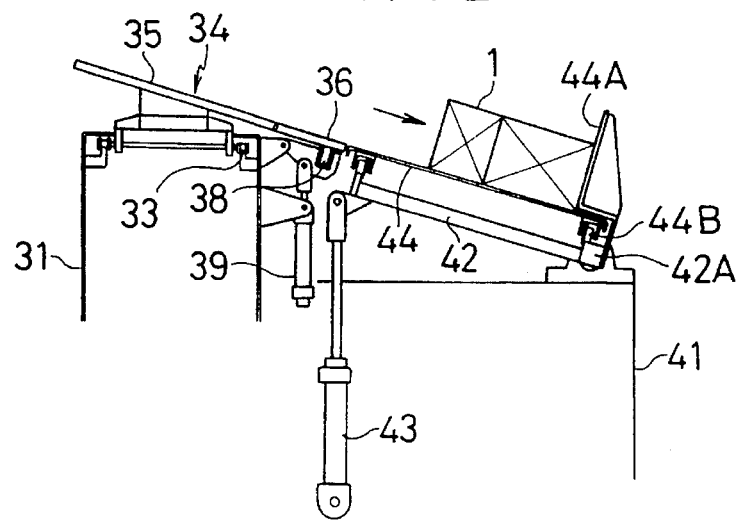

[ASSIGNMENT CALCULATION FLOW]

[STACK CALCULATION]

GOODS KIND No. 1 ⓐ

GOODS KIND No. 2 ⓑ

GOODS KIND No. 3 ⓒ

GOODS KIND No. 1 ⓐ

GOODS KIND No. 2 ⓑ

GOODS KIND No. 3 ⓒ

GOODS KIND No. 1

GOODS KIND No. 2

GOODS KIND No. 3

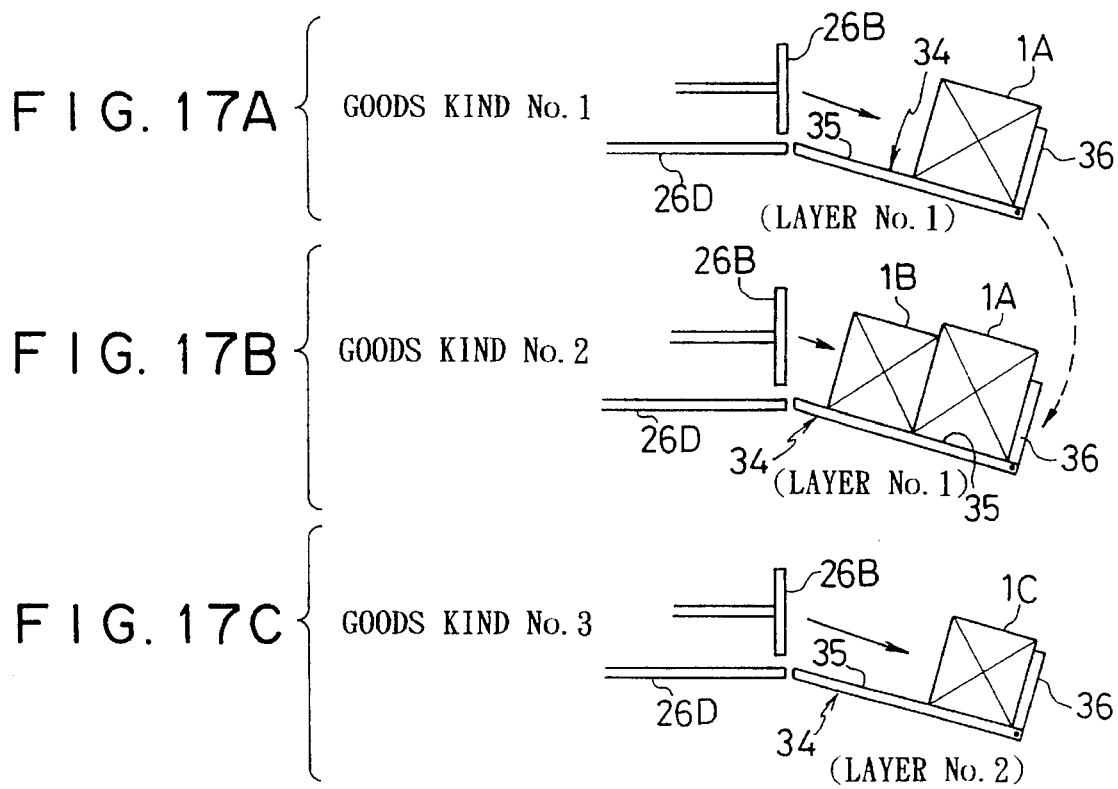
FIG. 17A GOODS KIND No. 1
FIG. 17B GOODS KIND No. 2
FIG. 17C GOODS KIND No. 3
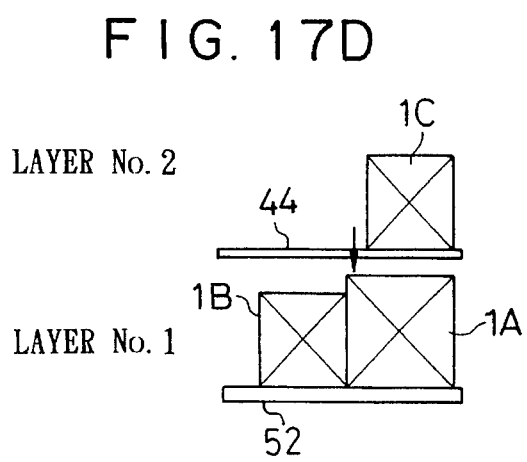
FIG. 17D
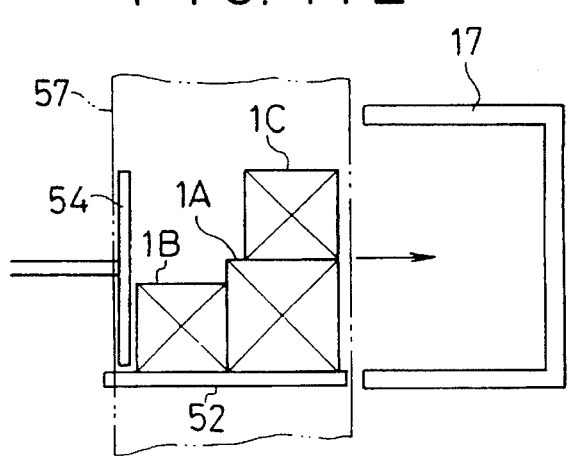
FIG. 17E

GOODS COLLECTION METHOD AND APPARATUS

BACKGROUND OF THE INVENTION

Field of the Invention

The present invention relates to a method of and an apparatus for collecting goods suitable for receiving box-shaped goods and accommodating these goods in containers or the like in goods distribution centers or the like.

BRIEF DESCRIPTION OF THE DRAWINGS

The present invention will be more fully understood from the detailed description given below and from the accompanying drawings which should not be taken to be a limitation on the invention, but for explanation and understanding only.

The drawings:

FIG. 5 is a fragmentary perspective view showing a collection form deformation prevention wall provided in the table unit;

FIGS. 6A and 6B are views illustrating a step of transfer of goods from the goods delivery unit to a goods receptacle;

FIGS. 7A and 7B are views illustrating a step of transfer of first layer goods from the receptacle to the shutter;

FIGS. 17A to 17E are schematic views illustrating a method of collecting goods in a container according to the invention.

DESCRIPTION OF THE BACKGROUND ART

FIGS. 14A to 14C and 16A to 16C show prior art methods of collecting box-shaped goods.

Figure 14A:
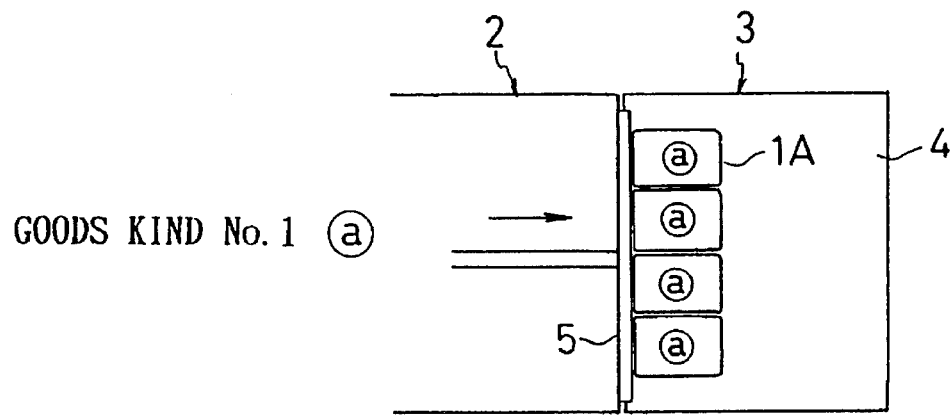
FIGS. 14A to 14C are schematic views illustrating a prior art method of collecting goods on a goods receptacle.
Figure 14B:
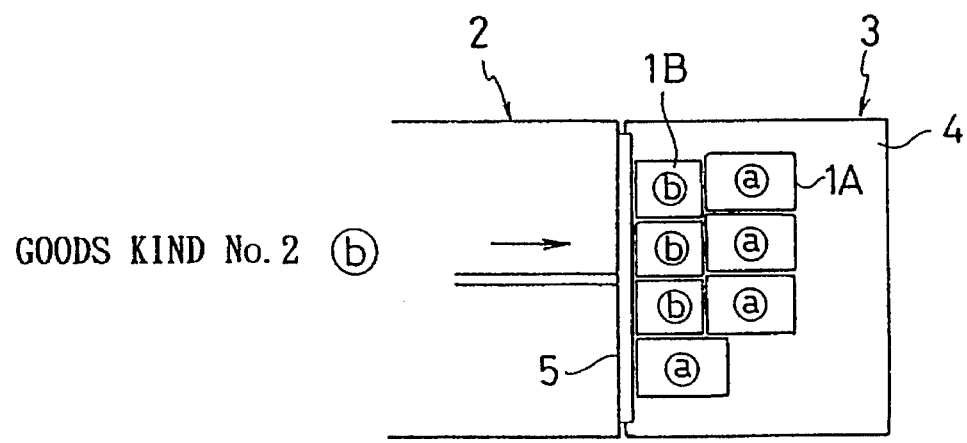
Figure 14C:
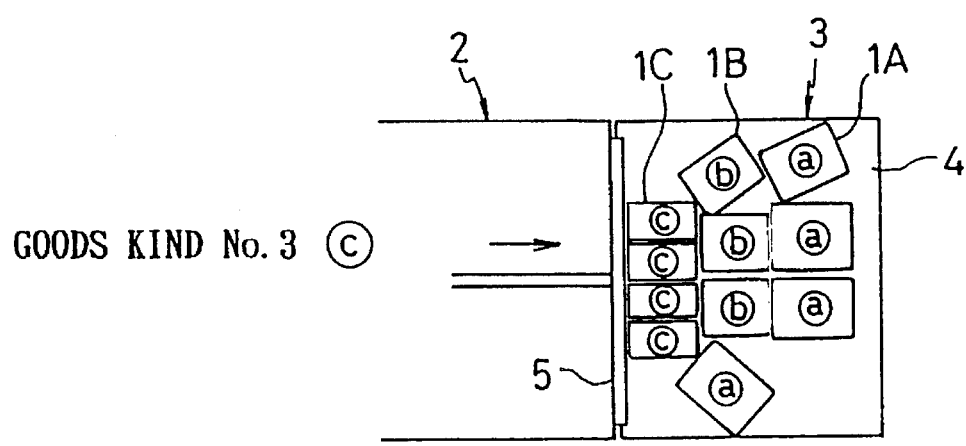

In the method of goods collection shown in FIGS. 14A to 14C, goods 1 delivered from a goods delivery unit 2 are successively received on a goods receptacle 3. The goods receptacle 3 has a fiat goods reception surface 4, and goods 1 delivered from the goods delivery unit 2 are pushed by a pusher plate 5 to a goods reception area of the goods reception surface 4. FIG. 14A shows a received state of a first kind of goods 1A. FIG. 14B shows a received state of a second kind of goods 1B. FIG. 14C shows a received state of a third kind of goods 1C. When the succeeding goods 1B (or 1C) are pushed by the pusher plate 5, the goods 1A (or 1A and 1B) that have already been received are pushed by the succeeding goods from the goods reception side of the goods receptacle 4 to the other side.

Figure 16A:
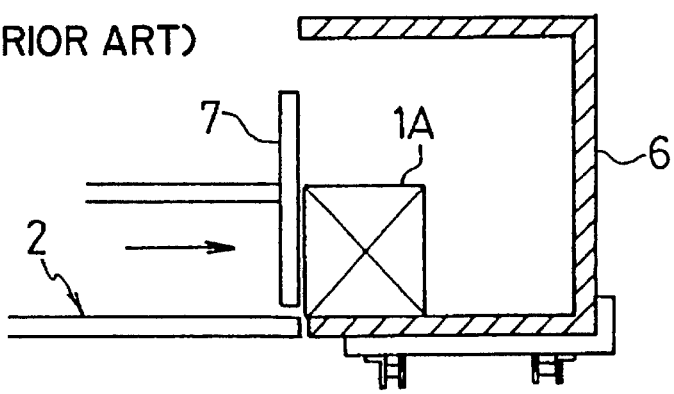
FIGS. 16A to 16C are schematic views illustrating a prior art method of collecting goods in a container.
Figure 16B:
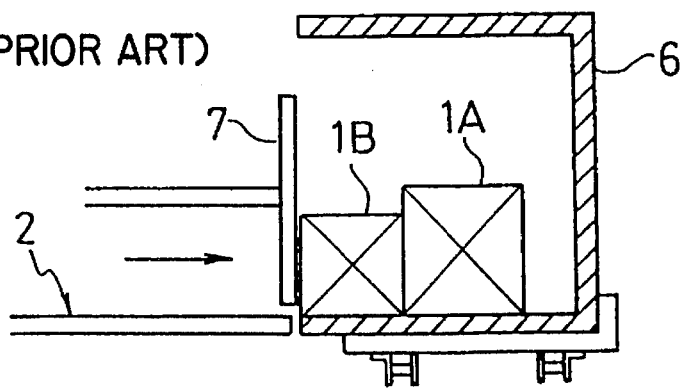
Figure 16C:
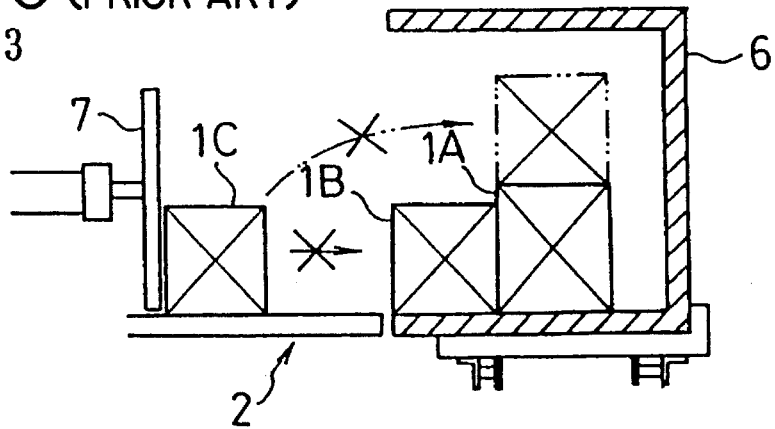

In the method of goods collection shown in FIGS. 16A to 16C, goods 1 delivered from the goods delivery unit 2 are successively accommodated in a container 6. In this instance, goods 1 delivered from the goods delivery unit 2 are directly pushed by a pusher plate 7 into the container 6. FIG. 16A shows an accommodated state of a first kind of goods 1A. FIG. 16B shows an accommodated state of a second kind of goods 1B. FIG. 16C shows a state, in which a third kind of goods 1C can not be accommodated.

The prior art as shown above, however, has the following problems.

In the goods collection method shown in FIGS. 14A to 14C, the goods reception surface 4 of the goods receptacle 3 lies in a horizontal plane. Individual goods 1 are thus pushed by the pusher plate 5 to the goods reception area of the goods reception surface 4, and subsequently pushed further by succeeding goods 1, which are pushed in likewise by the pusher plate 5, to the remote side of the goods reception area. Therefore, if the preceding and succeeding goods are different in shape and/or size, the collection form of the preceding goods on the goods reception surface 4 are likely to be disturbed as the preceding goods are pushed by the succeeding goods. This prevents a highly dense collection of goods in a predetermined aligned collection form on the goods reception surface 4 (FIG. 14C).

In the goods collection method shown in FIGS. 16A to 16C, goods 1 delivered from the goods delivery unit 2 are directly pushed by the pusher plate 7 into the container 6. Therefore, it is impossible to stack succeeding goods on preceding goods having been already accommodated in the container. That is, despite the presence of a sufficient empty space over the preceding goods in the container, the succeeding goods can not be accommodated in that space (FIG. 16C). A high density collection of the goods cannot be obtained in the container.

SUMMARY OF THE INVENTION

An object of the invention, when receiving goods in a goods receptacle and accommodating these goods in a container or the like, is to permit the goods to be collected in a high density format on the goods reception surface in a predetermined aligned collection form.

Another object of the invention, when receiving goods in a goods receptacle and accommodating these goods in a container or the like, is to permit the goods to be collected in a high density format on the goods reception surface in a predetermined aligned high density form in a container or the like.

According to the invention, there is provided a goods collection method of successively receiving box-shaped goods delivered from a plurality of goods delivery units in predetermined quantities on a goods receptacle and loading these goods in a container or the like by:

inclining a goods reception surface of a goods receptacle from a goods reception side toward the other side, stopping received goods with a stopper wall provided on the other side of the surface; and causing the goods received on the goods receptacle to gather on the goods reception surface on the side thereof adjacent the stopper wall.

According to the invention, there is provided a goods collection apparatus for successively receiving box-shaped goods delivered from a plurality of goods delivery units in predetermined quantities on a goods receptacle and loading these goods in a container or the like, wherein the goods receptacle has a goods reception surface inclined downward from a goods reception side toward the other side and includes a stopper wall provided on the other side for stopping received goods.

According to the present invention, the following function is obtainable.

Figure 15A:
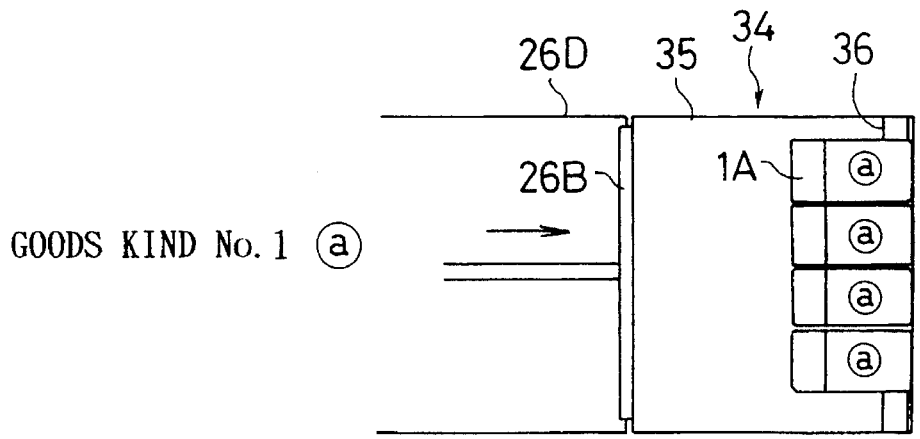
FIGS. 15A to 15C are schematic views illustrating a method of collecting goods on a goods receptacle according to the invention.
Figure 15B:
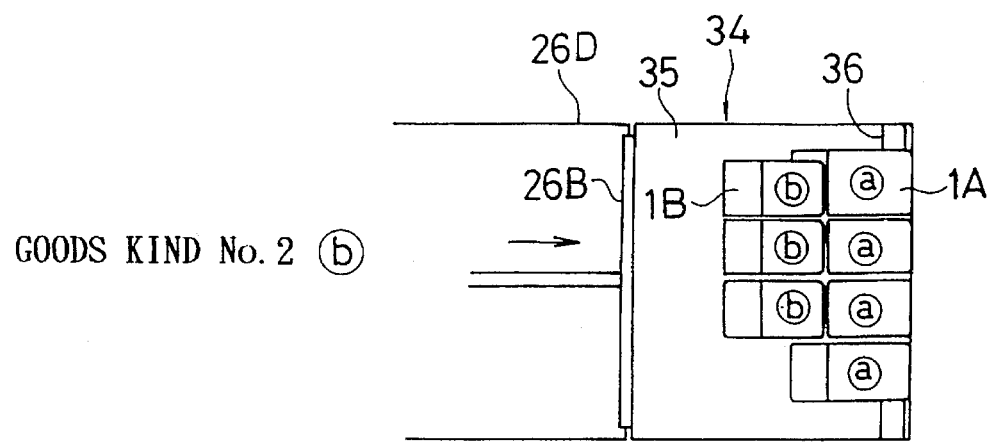

Goods 1A (or 1B) delivered from the goods delivery unit 11 and transferred earlier to the goods receptacle 34, slide over the slope of the goods reception surface 35, and at the lower end of the slope they are stopped or received in a predetermined collection form with one side thereof defined by the movable side wall 36, which is held in a closed state at this time (FIGS. 15A and 15B).

Figure 15C:
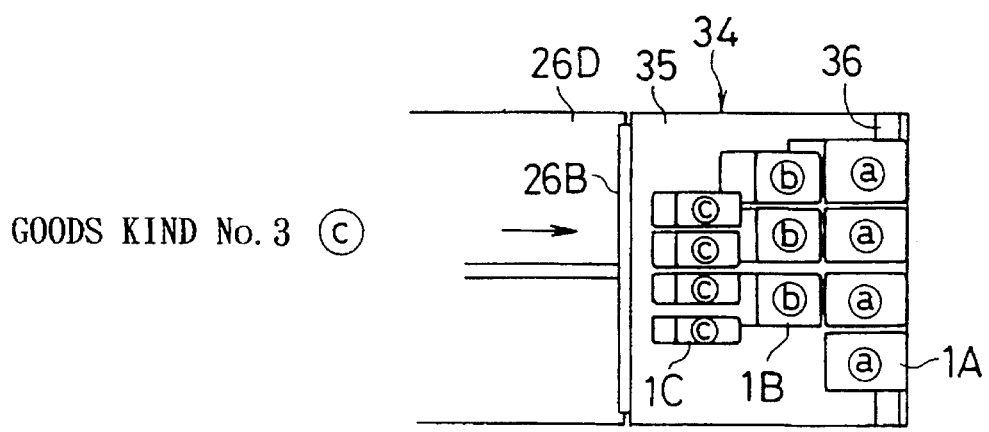

Succeeding goods 1B (or 1C) also slide along the slope of the goods reception surface 35, and on the side of the lower end of the slope of the goods reception surface 35, they are stopped or received in a predetermined collection form with one side thereof defined by one side of the goods 1A (or 1B) that have been received earlier and held in the predetermined collection form as noted above (FIGS. 15B and 15C).

Thus, the individual goods which are transferred successively, can be received in a stable manner such that they gather against the movable side wall 36. In other words, they can be collected in a high density format on the goods reception surface in a predetermined collection form.

According to the invention, there is provided a goods collection method of successively receiving box-shaped goods delivered from a plurality of goods delivery units in predetermined quantities on a goods receptacle and loading these goods in a vertical stack of a plurality of stages in a container or the like utilizing a structure with a goods receptacle having a goods reception surface inclined downward from a goods receptacle side toward the other side, the goods receptacle including a movable side wall for opening and closing a side zone on the other side;

a shutter disposed alongside the goods receptacle includes a shutter member capable of position change between a tilted position, at which goods delivered from the goods receptacle are received, and a horizontal position, at which the goods are delivered, the shutter member being opened at the horizontal position to permit delivery of goods; and a table unit disposed beneath the shutter and including a stacking table for supporting goods delivered from the shutter, the stacking table being capable of being raised and lowered to stack goods delivered from the shutter on goods delivered earlier on the stacking table;

the steps of the method comprising, gathering the goods received on the goods receptacle onto the goods reception surface such as to be on the side thereof adjacent the movable side wall in a closed state;

opening the movable side wall of the goods receptacle to cause the goods on the goods reception surface to slide and be transferred to the shutter member of the shutter having substantially the same slope of inclination as the goods reception surface; and moving the shutter member of the shutter to the horizontal and opened position to stack goods from the shutter member on the stacking table of the table unit; and collecting, transferring and stacking goods being carried out repeatedly to collect goods in a vertical stack of a plurality of stages on the stacking table.

According to the invention, there is provided a goods collection apparatus for successively receiving box-shaped goods delivered from a plurality of goods delivery units in predetermined quantities on a goods receptacle and loading these goods in a vertical stack of a plurality of stages in a container or the like comprising:

a goods receptacle having a goods reception surface inclined downward from a goods reception side toward the other side, the goods receptacle including a movable side wall for opening and closing a side zone on the other side;

a shutter disposed side-wise of the goods receptacle and including a shutter member capable of position change between a tilted position, at which goods delivered from the goods receptacle are received, and a horizontal position, at which the goods are delivered, the shutter member being opened at the horizontal position to permit delivery of goods; and a table unit disposed beneath the shutter and including a stacking table for supporting goods delivered from the shutter, the stacking table being capable of being raised and lowered to stack goods delivered from the shutter on goods delivered earlier on the stacking table.

According to the present invention, the following further function is obtainable.

When transferring goods 1 delivered from the goods delivery unit 11 successively onto two or more goods receptacles 34 and then accommodating the goods 1 on each goods receptacle 34 in the container 17, goods 1A and 1B, for instance, are collected in a high density format on a first goods receptacle 34A in the manner described above, and then goods 1C are collected in a high density format on a second goods receptacle 34B in the manner of described above (FIGS. 17A to 17C).

Then, the movable side wall 36 of the first goods receptacle 34A is opened, whereby the goods 1A and 1B collected thereon in a predetermined collection form are transferred without deformation of the collection form from the inclined goods reception surface 35 onto the shutter member 44 which is inclined substantially with the same slope. Thereafter, the shutter member 44 is brought to a horizontal position and then opened, whereby the goods 1A and 1B are transferred onto the stacking table 52 without change in their predetermined collection form (FIG. 17C).

Then, the movable side wall 36 of the second goods receptacle 34B is opened, whereby the goods 1C collected thereon in a predetermined collection form are transferred without deformation of the collection form from the inclined goods reception surface 35 onto the shutter member 44 which is inclined substantially with the same slope. Thereafter, the shutter member 44 is brought to the horizontal position and opened, whereby the goods 1C are transferred and stacked on the goods 1A and 1B having already been tansferred onto the stacking table 52 without change in the predetermined collection form (FIGS. 17D and 17E). At this time, the goods 1C can be stacked without deformation of their collection form on the goods 1A and 1B because the lower goods 1A and 1B are aligned in a compact manner without any intervening gap.

The goods 1A to 1C which are thus stacked on the stacking table 52 are then pushed into and accommodated in the container 17 by the pusher plate 54 (FIG. 17E).

Thus, a plurality of different kinds of goods can be accommodated without deformation of their collection form and in a stacked state in the container. In other words, they can be stacked in a high density format in the container.

According to the invention, there is provided a goods collection apparatus, in which the shutter farther includes a scraper for stopping goods on and moved with the shutter member when the shutter member is opened, the movable side wall of the goods receptacle and the scraper of the shutter serving to stop perpendicular sides of goods, respectively.

According to the present invention, the further following function is obtainable.

The movable side wall of the goods receptacle and the scraper of the shutter are disposed such as to stop perpendicular surfaces of goods. More specifically, when goods are received on the goods reception surface of the goods receptacle, their X-direction position is regulated with their one side defined by the movable side wall. Subsequently, when the goods are delivered from the shutter member 44 of the shutter 13, their Y-direction position is regulated with the other side pushed against the scraper. In consquence, they are delivered in an aligned form with respect to the two, i.e., the X and Y, directions of the table unit.

According to the invention, there is provided a goods reception conveyor for conveying box-shaped goods placed on goods reception surface of goods receptacle, the goods receptacle having a goods reception surface inclined in a direction crossing a conveying direction and including a movable side wall capable of opening and closing a zone on a lower end side in the direction of inclination of the goods reception surface.

According to the present invention, the following farther function is obtainable.

Box-shaped goods which are delivered to the goods receptacle of the goods reception conveyor, slide along the slope of the goods reception surface, and at the lower end of the slope of the goods reception surface, they are given a predetermined collection form with their one side defined by the movable side wall in the closed state. In this state, they are conveyed. At the goods delivery position, the side wall provided at the lower end of the slope of the goods reception surface is opened, whereby the goods held in predetermined collection form are delivered in predetermined collection form as a delivery form to the following step. Thus, in the following step (such as transferring goods, accommodating goods in containers, etc.), the goods can be readily handled.

DESCRIPTION OF THE PREFERRED EMBODIMENT

Figure 1:
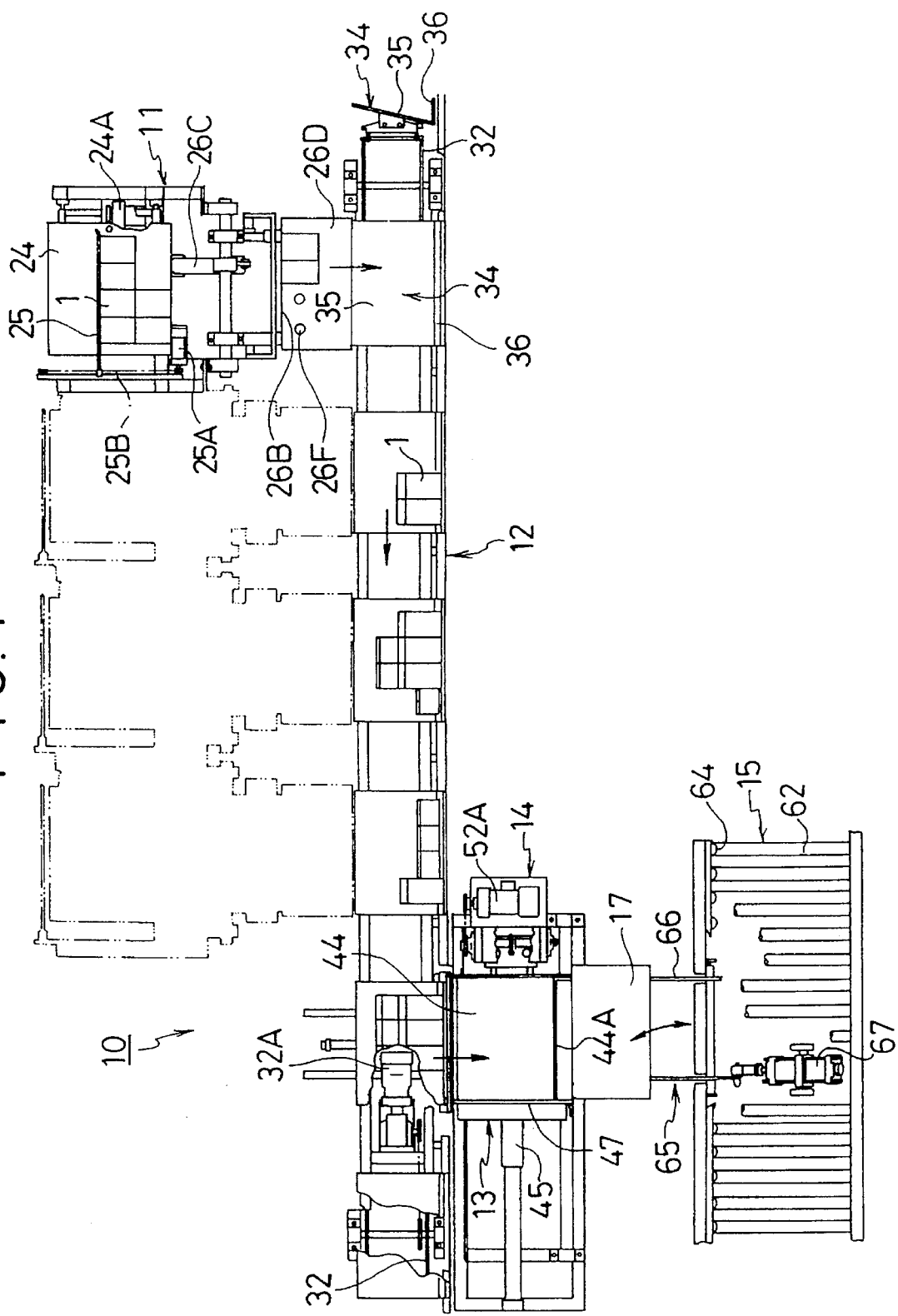
FIG. 1 is a schematic plan view showing the layout of a goods collection apparatus according to the invention.

Referring mainly to FIG. 1, there is shown a goods collection apparatus generally designated at 10, which comprises a goods delivery unit 11, a goods reception conveyor 12, a shutter 13, a table unit 14 and a container conveyor 15. The goods delivery unit 11 of the apparatus 10 delivers box-shaped goods 1 in necessary quantities from a cardboard box 16 to one or more goods receptacles 34, which are provided on the goods reception conveyor 12. Goods which are collected on the goods reception conveyor 12 for each customer are transferred for stacking to the table unit 14 via the shutter 13. Goods which are stacked on the table unit 14 for each customer are accommodated and conveyed in a container 17 on the side of the container conveyor 15.

Now, the goods delivery unit 11, goods reception conveyor 12, shutter 13, table unit 14 and container conveyor 15 will be described in detail.

Figure 2:
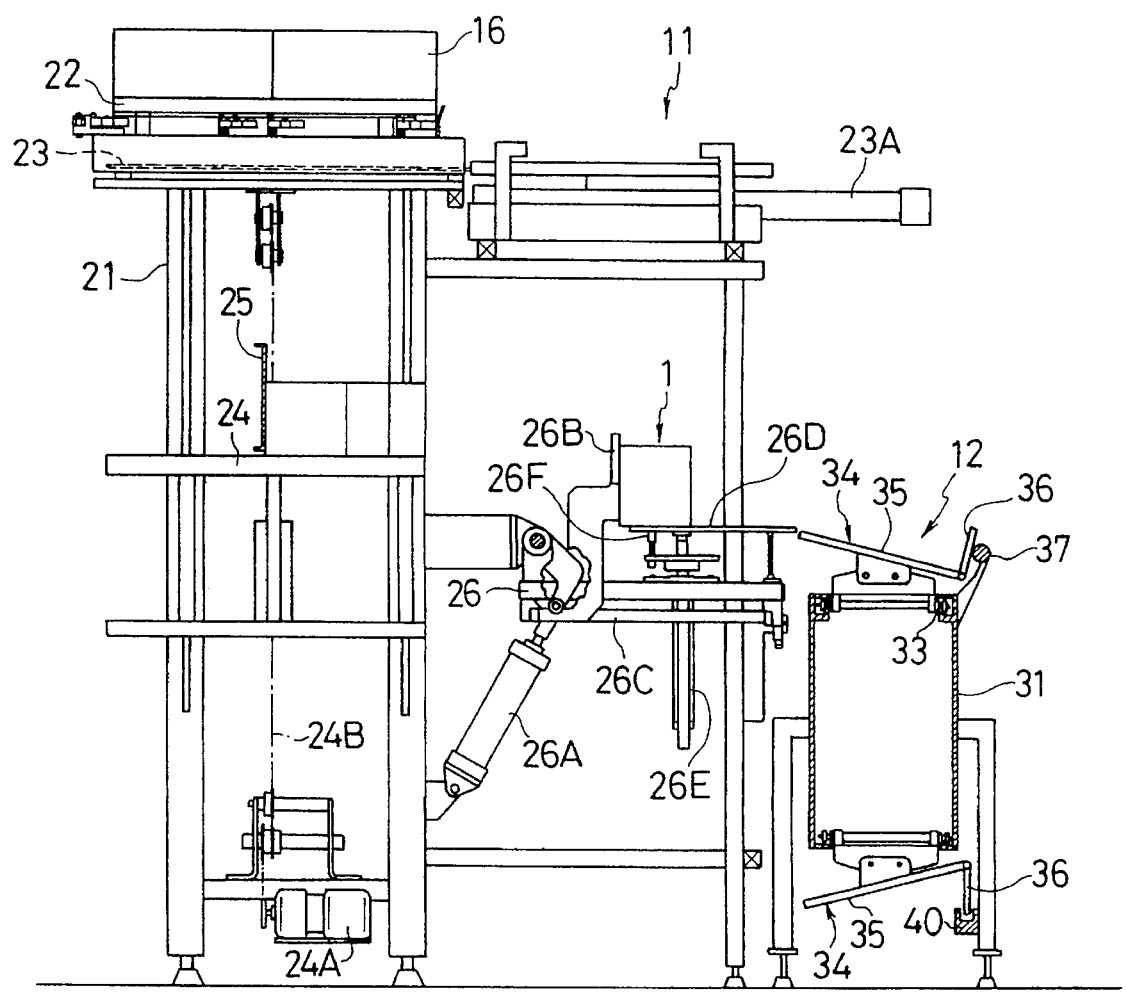
FIG. 2 is a front view showing a goods delivery unit and a goods reception conveyor.

(A) Goods delivery unit 11 (FIGS. 1 and 2)

In the goods collection apparatus 10, a plurality of goods delivery units 11 are provided in parallel at respective positions along the conveying line of the goods reception conveyor 12. The individual goods delivery units 11 can deliver different kinds (or the same kind) of goods 1 (1A, 1B, ... ).

Each goods delivery unit 11 includes a rack 21 provided at the top with a cardboard box support 22, on which a cardboard box 16 is placed. Beneath the cardboard box support 22, a shutter member 23 is provided such that it can be opened and closed. Beneath the shutter member 23, a lift table 24 is provided such that it can be raised and lowered. The shutter member 23 is driven for opening and closing by a piston-cylinder assembly 23A. The lift table 24 is coupled to and driven for raising and lowering by a chain 24B which is driven by a lift motor 24A.

The cardboard 16 with goods 1 therein is placed, with its lid removed and its opening directed down, on the cardboard box support 22 by a robot or the like, and goods 1 in the cardboard box 16 are supported on the shutter member 23 in the closed state. The lift table 24 is raised and lowered between a position at which goods are transferred to a delivery table 26D to be described later, and a position at which goods are received from the shutter member 23. With the lift table 24 at its upper goods reception position, the shutter member 23 is opened, whereby the goods 1 in the cardboard box 16 supported on the shutter member 23 are transferred onto the lift table 24.

Behind the lift table 24 at the goods delivery position, a pusher plate 25 is moved along the top surface of the lift table 24 to bring the front side of the goods 1 on the lift table 24 to the front edge thereof (i.e., to a position, at which the goods 1 can be in contact with the delivery table 26D). The pusher plate 25 is coupled to and driven by a chain 24B which is driven by a motor 25A.

On the front side of the lift table 24 at the goods delivery position, a delivery base 26 is supported for swinging over a span of 90 degrees. The delivery base 26 is driven for swinging by a piston-cylinder assembly 26A. The delivery base 26B has a goods support member 26B, which is flush with the lift table 24 at the goods delivery position and is slidingly driven by a piston-cylinder assembly 26C. The delivery table 26D) noted above is disposed at 90 degrees with respect to the goods support member 26B and is driven for advancement and retraction by a piston-cylinder assembly 26E. It carries a suction pad 26F.

When the delivery base 26 is brought to its upright position, the goods support member 26B is set to be flush with the lift table 24 at the goods delivery position. In this state, the delivery table 26D and suction pad 26F are advanced by the piston-cylinder assembly 26E, whereby the front side of the forward row of goods 1 on the lift table 24 is sucked to the suction pad 26F. Then, the delivery table 26D and suction pad 26F are retracted by the piston-cylinder assembly 26E, whereby the above goods 1 that have been sucked to the suction pad 26F are withdrawn to the goods support member 26B. Then, the delivery table 26 is set to its horizontal position, whereby the goods 1 are supported on the delivery table 26D. In this state, the suction by the suction pad 26F is released, and the goods support member 26B is advanced by the piston-cylinder assembly 26C. As a result, the goods 1 are pushed by the goods support member 26B to slide over the delivery table 26D and be delivered to the side of the goods reception conveyor 12.

Thus, the goods delivery unit 11 delivers with its pusher plate 25 the goods 1 of the kind which is assigned to it from the forward row from the lift table 24 via the delivery table 26D to the side of the goods reception conveyor 12. The individual goods delivery units 11 deliver different kinds (or the same kind) of goods 1 in necessary quantities to the same goods receptacle 34 or different goods receptacles 34 on the goods reception conveyor 12.

Figure 3:
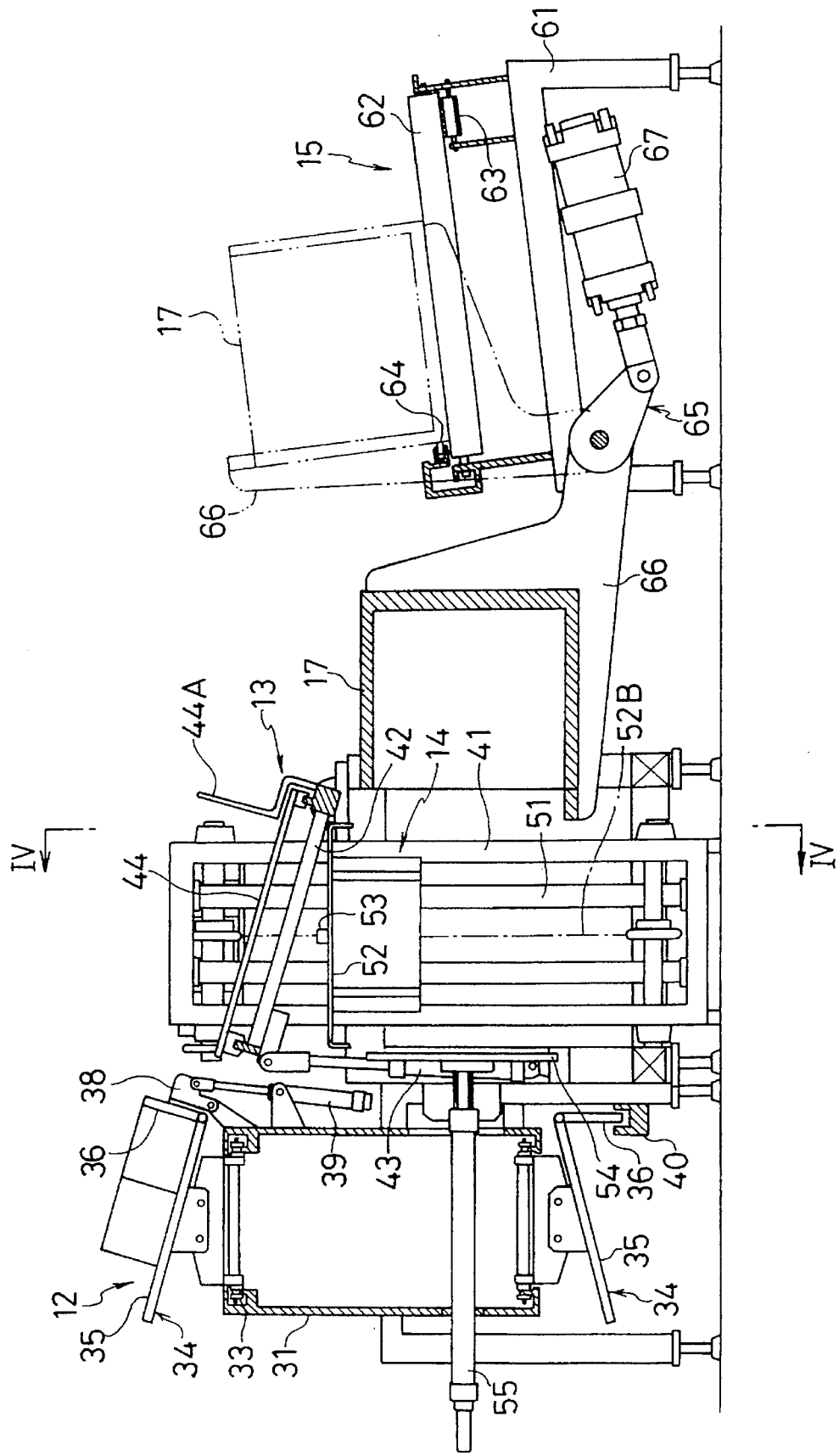
FIG. 3 is a front view showing the goods reception conveyor, a shutter, a table unit and a container conveyor.

(B) Goods reception conveyor (FIGS. 1 to 3)

The goods reception conveyor 12 includes a rack 31 provided at opposite ends thereof with sprocket wheels 32, round which an endless chain 33 is passed. One of the sprocket wheels 32 can be driven from a motor 32A. The goods reception conveyor 12 has a plurality of goods receptacles 34 which are mounted at a predetermined pitch on the chain 33. Each goods receptacle 34 has a goods reception surface 35, which is inclined downwardly from a goods reception side nearer the goods delivery unit 11 (see FIG. 2) toward the other side nearer the shutter 13 (see FIG. 3) (i.e., in the direction perpendicular to the conveying direction of the goods reception conveyor 12). On the other side noted above, a movable side wall 36 is provided for opening and closing a lower end zone of the goods reception surface 35 in the inclined direction.

In the upper run of the conveying line of the goods reception conveyor 12, the movable side wall 36, (a) is held in its upright closing position by a side wall guide 37, which is mounted on the rack 31 and extends in the direction of the conveying line noted above, to be ready for stopping and receiving goods 1 to the shutter 13 and (b), in the position of goods delivery to the shutter 13, can be opened and closed by a side wall stopper 38 which is pivoted to the rack 31. The side wall stopper 38 is swingably driven by a tilt piston-cylinder assembly 39 mounted on the rack 31 to switch the side wall guide 37 between a closing position, at which the guide 37 is at the same angle as in (a) above, and an opening position, at which the guide is at the same angle as the angle of inclination of the goods reception surface 35.

More specifically, goods 1 delivered from each goods delivery unit 11 in the manner as in (a) above, are received on the goods reception surface 35 of a corresponding goods receptacle 34 on the goods reception conveyor 12. The goods 1 received on the goods reception surface 35 slide along the slope thereof to be stopped by the movable side wall in the closed state, and thus they are received in a predetermined collection form with one side thereof defined by the movable side wall 36. Succeeding goods 1 which are also delivered from each goods delivery unit 11 to the goods reception surface 35 of the goods receptacle 34, also slide along the slope of the goods reception surface 35 and are thus received in a predetermined collection form with one side thereof defined by one side of the goods that have already been received.

In the lower run of the conveying line of the goods reception conveyor 12, the movable side wall 36 is moved along a groove formed in a side wall reception member 40, which is mounted on the rack 31 and extends in the conveying direction, to prevent lateral vibrations.

Figure 4:
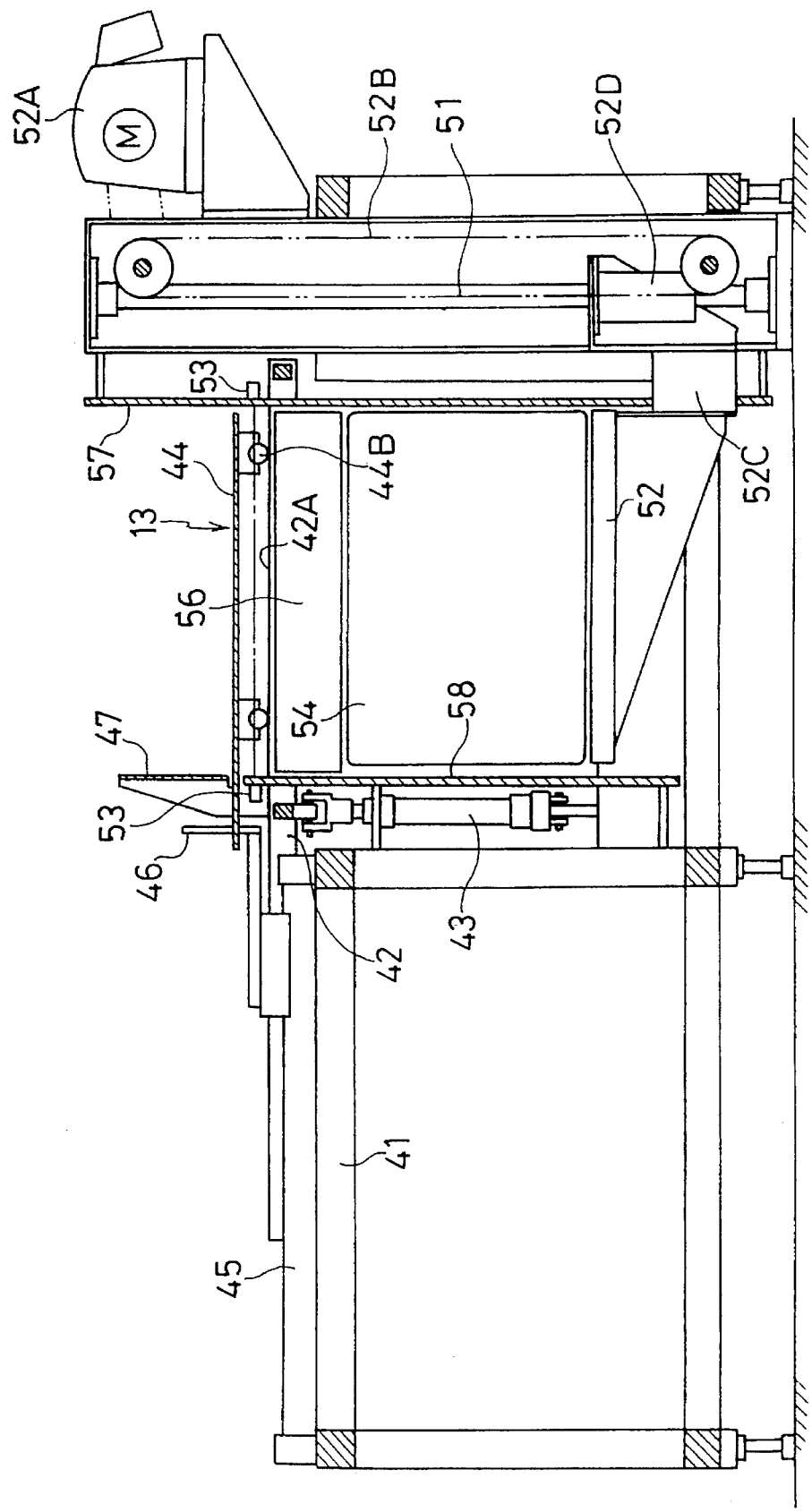
FIG. 4 is a sectional view taken along arrow line IV—IV in FIG. 3.

(C) Shutter 13 (FIGS. 1, 3 and 4)

The shutter 13 is disposed alongside of the position of goods delivered to each goods receptacle 34 on the goods reception conveyor 12. The shutter 13 includes a rack 41, on which a tilt frame 42 is mounted for tilting by a tilt piston-cylinder assembly 43. The shutter 13 also includes a shutter member 44 which is movable along guide rails 42A provided on the tilt frame 42 between a closing position and an opening position. An upright stopper member 44A is provided on the side of the shutter member 44 opposite the goods reception conveyor, i.e., on the side of the lower end of the shutter member 44 in the tilted state. Designated as 44B are wheels. The shutter member 44 is driven by an opening/closing piston-cylinder assembly 45 between the closing and opening positions noted above. The piston rod of the opening/closing piston-cylinder assembly 45 has a pin 46 provided at its end. A coupling hole provided in the shutter member 44 is engaged on the pin 46.

In the shutter 13, the tilting of the tilt frame 42 caused by the tilt piston-cylinder assembly 43 causes a position change of the shutter member 44 between a tilted and a horizontal position. In its tilted position, the shutter member 44 has substantially the same slope of inclination as that of the goods reception surface 35 of the goods receptacle 34, so that goods 1 delivered from the goods reception surface 35 when the movable side wall 36 is opened, are stopped by the reception stopper 44A without deformation of their collection form on the goods reception surface 35. At this time, the shutter member 44 is in its closed position.

In its horizontal position, the shutter member 44 of the shutter 13 is brought to its open position by the opening/closing piston-cylinder assembly 45, whereby goods 1 that have been received on it can be delivered to the lower table unit 14.

In the shutter 13, the tilt frame 42 has a scraper 47. The scraper 47 is set on the side of the opening/closing piston-cylinder assembly 45 of the shutter member 44, and when the shutter member 44 is opened and moved along guide rails 42A, goods 1 on the shutter member 44 are contacted by scraper 47 and stopped thereagainst.

At this time, the movable side wall 36 of the goods receptacle 34 and the scraper 47 of the shutter 13 are adapted to stop perpendicular sides of the goods 1. More specifically, when the goods 1 are received on the goods reception surface 35 of the goods receptacle 34, their X direction position is regulated with one side defined by the movable side wall 36, and when they are subsequently delivered from the shutter member 44 of the shutter 13, their Y direction position is regulated with another side of them pushed against the scraper 47. Thus, they are delivered in their collection form aligned in both the X and Y directions to the side of the table unit 14.

Figure 18:
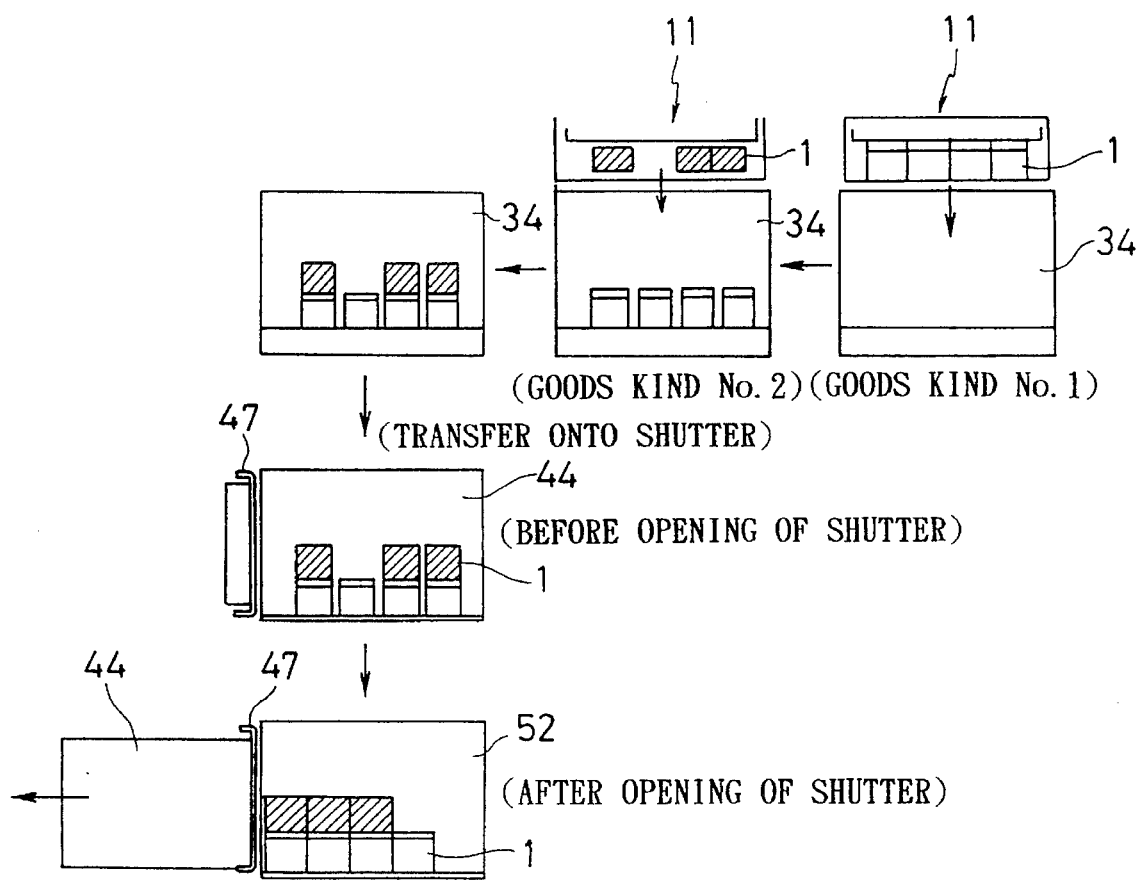
FIG. 18 is a schematic illustration of a compacting function of a scraper.

The scraper 47 further has the following function. As shown in FIG. 18, the goods that are on the shutter member 44 before the opening thereof can be such that some of them are missing, depending on the stock-state of the goods delivery unit 11, or arranged loosely with an intervening gap therebetween as a result of a shock produced at the time of the reception, or they could be positioned in the center of the goods receptacle 34. Even when the goods are spaced apart from the scraper 47 on the shutter member 44 or arranged loosely with an intervening gap between adjacent ones of them, with the opening of the shutter member 44, they are moved therewith and gather toward the scraper 47 so that they can be arranged compactly without any intervening gap between adjacent ones of them with the scraper 47 as a reference. Succeedingly delivered goods thus can be stacked with stability onto these goods. The succeeding goods are also made compact by the action of the scraper 47.

(D) Table unit (FIGS. 1, 3 and 4)

The table unit 14 is disposed beneath the shutter 13. It includes two upright lift guides 51, 51 provided on the side of the rack 41 noted above opposite the opening/closing piston-cylinder assembly of the shutter member 44. On the lift guides 51, 51, a table support member 52C which is integral with a stacking table 52 is cantilevered for raising and lowering. The stacking table 52 is coupled to a chain 52B driven by a lift motor 52A, and thus it can be raised and lowered between a lower and an upper set position. Designated at 52D is a linear bearing.

In its lower set position, the stacking table 52 is stopped at the same level as the lowermost surface of and in contact with a horizontally directed container 17 on the side of the container conveyor 15. In its upper set position, the stacking table 52 is stopped at a level, at which an optical sensor 53 provided on the rack 41 detects that the stacking table 52 is empty or detects the uppermost surface of goods 1 on the stacking table 52. Thus, the stacking table 52 waits at its upper set position without interference from the shutter member 44 of the shutter 13. Alternatively, the upper set position of the stacking table 52 may be determined from the calculation of the upper most surface level of product from the product size.

Thus, in the table unit 14, the stacking table 52 supporting goods 1 delivered from the shutter 13 can be raised and lowered for stacking the goods 1 successively on goods 1 that have already been delivered from the shutter 13 to the lift table 52. Whenever goods 1 are stacked vertically, the stacking table 52 is lowered again in response to the detecting operation of the optical sensor 53. When a stack of a predetermined number of layers is completed, the stacking table 52 is lowered down to and stopped at its lower set position which is a level for accommodating goods in the container 17.

The table unit 14 further includes a pusher plate 54 for pushing goods 1 on the stacking table 52 at the lower set position into the container 17. The pusher plate 54 is driven by a push piston-cylinder assembly 55.

In the table unit 14, as shown in FIGS. 4 and 5, collection form deformation prevention walls 56 to 58 are provided on three of all the four sides enclosing the space of vertical movement of the stacking table 52 other than the front side facing the container 17. The deformation prevention wall 56 is flush with the pusher plate 54. The deformation prevention wall 57 on the side of the lift guide 51 has a slit 57A, through which the table support member 52C is passed. Goods 1 which have been aligned in both the X and Y directions on the shutter 13, can be stacked on the stacking table 52 of the table unit 14 and lowered down into the container 17 without deformation of their collection form because during this time their three sides are enclosed by the collection form deformation prevention walls 56 to 58 and pusher plate 54. Of the collection form of the goods 1, the side which faces the container 17, and on which no collection form deformation prevention wall is provided, has been aligned on the shutter 13 by the stopper 44A, and thus it is not easily deformed.

(E) Container conveyor 15 (FIGS. 1 and 3)

The container conveyor 15 can convey containers 17 on a roller conveyor 62 provided on a rack 61. Designated at 63 is a roller drive belt.

The roller conveyor 62 has its conveying surface inclined downward (with an inclination angle α) toward the table unit 14, and container guide rollers 64 are provided at the lower end of the slope of inclination of the container. Each container 17 thus is conveyed with its bottom placed on the roller conveyor 62 and the lower edge of one of its sides is guided by the container guide rollers 64.

The container conveyor 15 includes a container turn-down mechanism 65, which is provided at a container turn-down position facing the front of the table unit 14. The container turn-down mechanism 65 has a container support arm 66 pivoted to the rack 61 for rotation by 90–α degrees (α being the inclination angle of the conveyor 62) and a piston-cylinder assembly 67 for causing the rotation of the support arm 66. In the container turn-down mechanism 65, the container support arm 66, in its state supporting the bottom and one side of a container 17 at the container turn-down position, is rotated by 90–α degrees to bring the container 17 to a goods accommodation position, at which the horizontal opening of the container 17 faces stacked goods on the stacking table 52. The container 17 which is at the horizontal goods accommodation position, has the inner surface of its lower side wall set at the same level as the stacking table 52 at the lower set position.

That is, when the container is brought to its horizontal goods accommodation position, the goods stacked on the stacking table 52 are pushed by the pusher plate 54 of the table unit 14 into the container 17 so that they are accommodated therein. Subsequently, the container 17 is returned onto the roller conveyor 62 by a returning operation of the container turn-down mechanism 65 and is then conveyed.

Now, a method of assigning goods receptacles 34 and containers 17 for individual customers with respect to all kinds of ordered goods handled by the goods collection apparatus 10, will be described (FIGS. 11 to 13), (Tables 1 to 3).

The total number of order cases is denoted by K (customer No. k), the number of different kinds of goods ordered by customer No. k by F (goods kind No. f), the depth of the container 17 by Wc, and the height of the container 17 by Hc. The assignment number of container 17 is denoted by m, and the assignment number of goods receptacle 34 by i. It is assumed that the width Lc of container 17 is set to be greater than the width of goods delivered to goods receptacle 34.

The quantity of goods of kind No. f to be delivered to customer No. k is denoted by P, the quantity of goods in one row of goods kind No. f in cardboard box 16 by n, the depth of goods in one row of goods kind No. f on goods receptacle 34 by w, and the height of goods in one row of goods kind No. f on goods receptacle 34 by h.

The maximum number of goods receptacles assigned to customer No. k is denoted by $i_{max}$, and the maximum height of goods on each goods receptacle 34 (No. i) by $h_{max}(i)$.

It is assumed that in the total number K of order cases, the goods kind No. f and the quantity P of goods of that kind are predetermined for customer No. k as in Table 1. In this situation, the number (i) of goods receptacles used, the number (j) of rows of goods assigned to the individual goods receptacles (No. i) and the number (m) of containers used are calculated for customer No. k. Table 2 shows the result of these assignment calculations. The quantity n of goods in one row in the cardboard box 16 with respect to good kind No. f and the depth w and height h are given as shown in Table 3.

Figure 11:
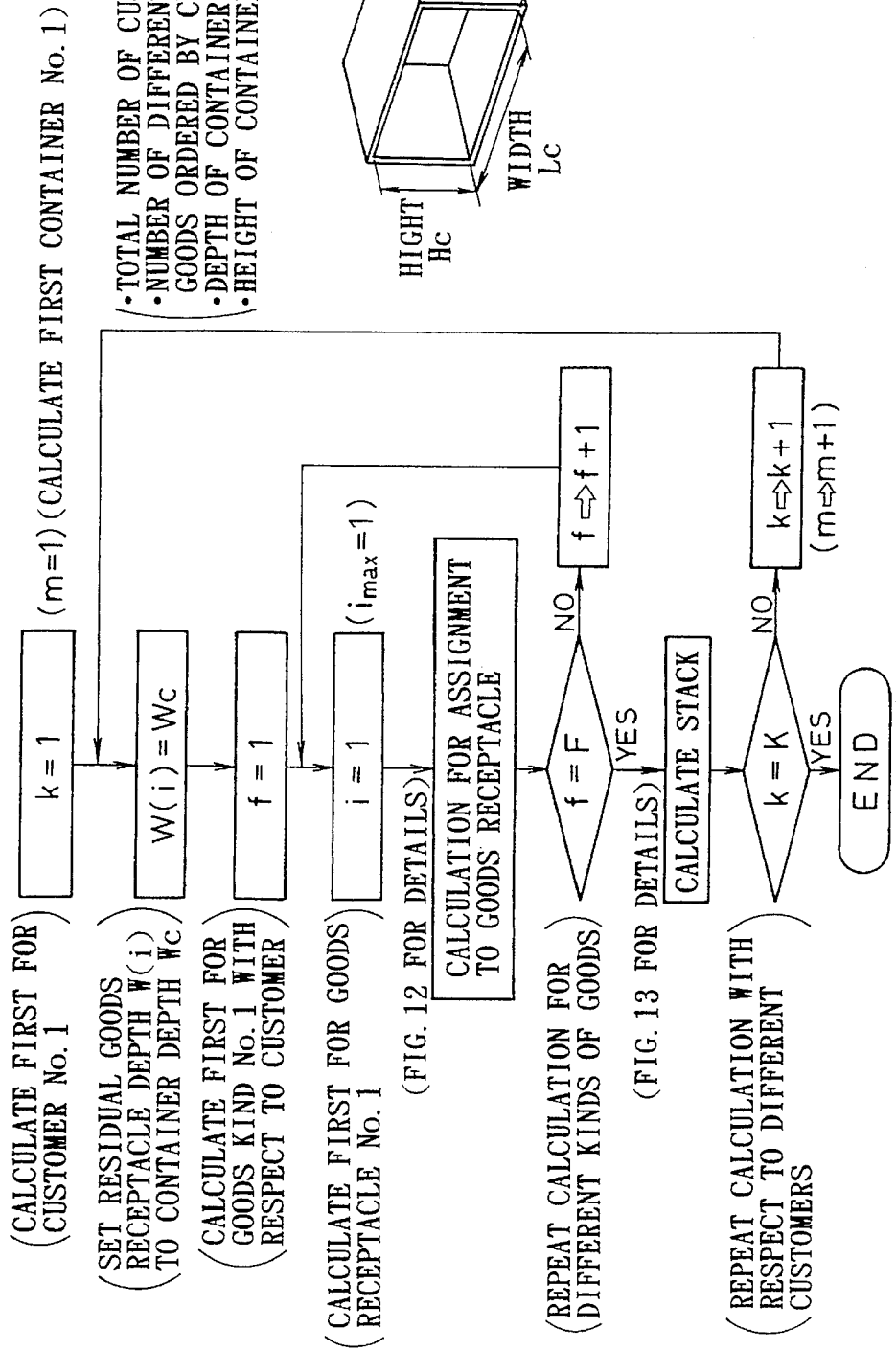
FIG. 11 is a flow chart of a routine for calculation concerning the assignment of goods receptacles and containers to individual customers with respect to all kinds of ordered goods.

(A) Overall assignment calculation routine (FIG. 11)

(1) The calculation is made first with respect to the first customer (k=1). At this time, to the first customer, containers are assigned from the first container (m=1).

(2) For all the goods receptacles 34 (i), the depth W(i) thereof is set to the depth Wc of container 17 W(i)=Wc).

While in this instance the depth of goods receptacle is set to be equal to the depth of container, it is also possible to set the depth of goods receptacle to be greater than the depth of container. By so doing, more goods can be accommodated in container 17.

(3) Calculation is made first for the first goods kind (f= 1) with respect to customer No. k.

(4) Calculation is made first for the first goods receptacle 34 (i=1).

(5) The number (i) of goods receptacles 34 used and the number 6) of rows of goods assigned to the pertinent goods receptacle 34 (No. i) are calculated in the assignment calculation routine (B) described below.

(6) The calculation in (5) above is repeatedly made for all kinds (f= F) of goods with respect to customer No. k.

(7) On the basis of the result of calculation in (6) above, the number (m) of containers 17, in which the goods received by the goods receptacles 34 (No. i) assigned to customer No. k are stackedly accommodated, is calculated in the assignment calculation routine (C) described below.

(8) The calculation in (7) above is made repeatedly for all order cases K.

Figure 12:
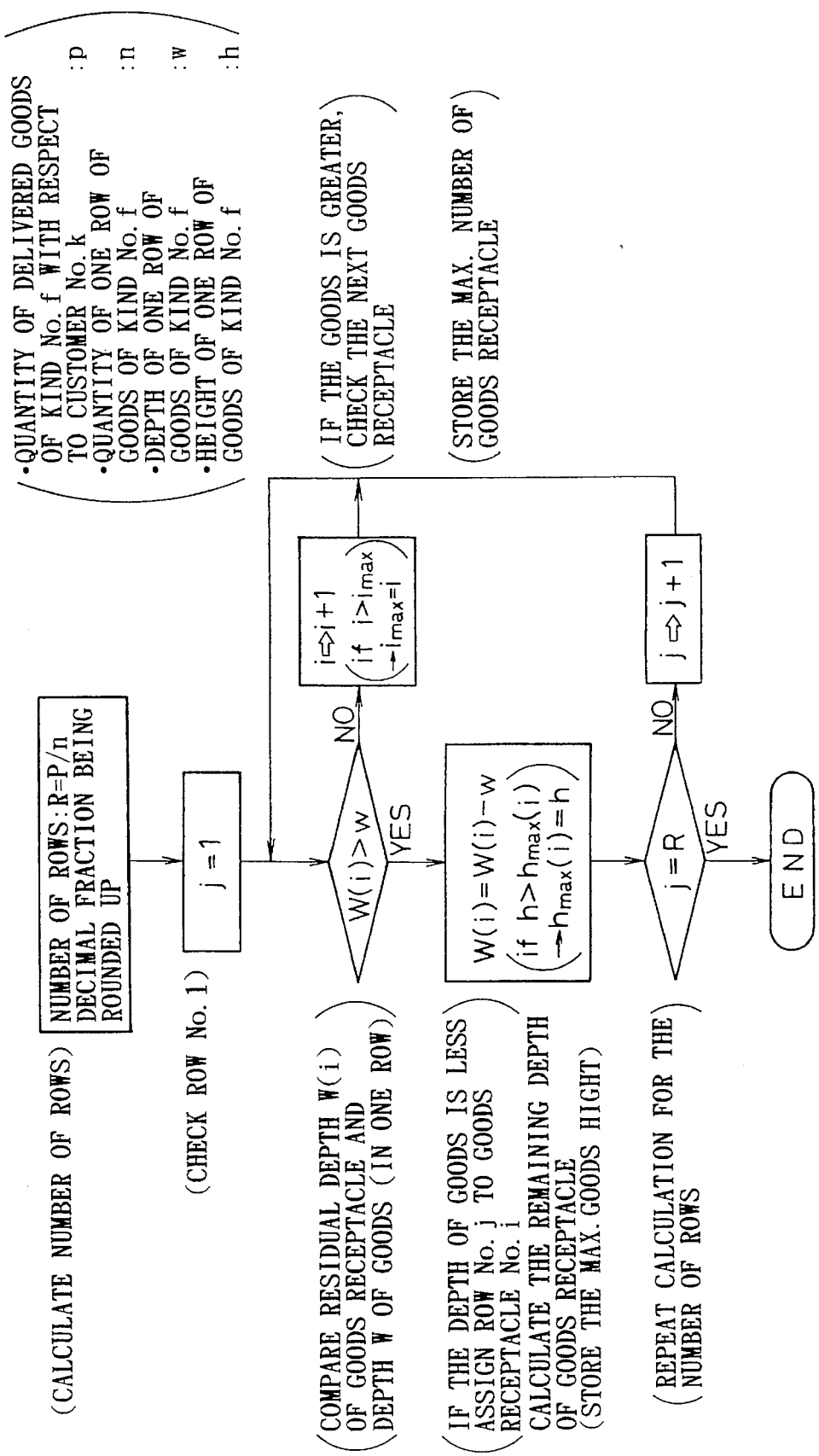
FIG. 12 is a flow chart of a routine for calculation concerning the assignment of goods receptacles to the individual customers.

(B) Calculation of the number of goods receptacles 34 assigned to customer No. k (FIG. 12)

(1) The number R of rows of goods of kind No. f assigned the goods receptacles 34 is calculated for the quantity P of goods of kind No. f with respect to customer No. k and the quantity n of goods in one row of goods kind No. f in cardboard box 16 (R=P/n). The fraction of the result of calculation is rounded up.

(2) A check is made as to whether assignment can be done from the first row (j=1).

(3) From the result in (2) above, the remaining depth W(i) of goods receptacle 34 and the depth w of one row of goods are compared. If the depth w is smaller, the row No. j of goods is assigned to the pertinent goods receptacle 34.

At this time, the remaining depth W(i) of goods receptacle 34 is calculated, and the old remaining depth W(i) is updated. Further, the maximum height $h_{max}(i)$ of goods 1 assigned to this goods receptacle 34 is stored.

(4) If it is found as a result of (2) above that unlike (3) above the depth w is greater, the row No. j of goods is assigned to the succeeding goods receptacle 34 (No. i+1).

At this time, the maximum number $i_{max}$ of goods receptacles 34 used for customer No. k is stored.

(5) The preceding steps (3) and (4) are executed repeatedly for all the number R of rows of goods of goods kind No. f.

While in this instance a check as to whether goods can be received on the goods receptacle 34 is done for every row of goods in the cardboard box 16, it is also possible to make the check for every goods kind. In this case, a comparison W(i)>w×R is made in the steps (3) and (4) outlined above.

Figure 13:
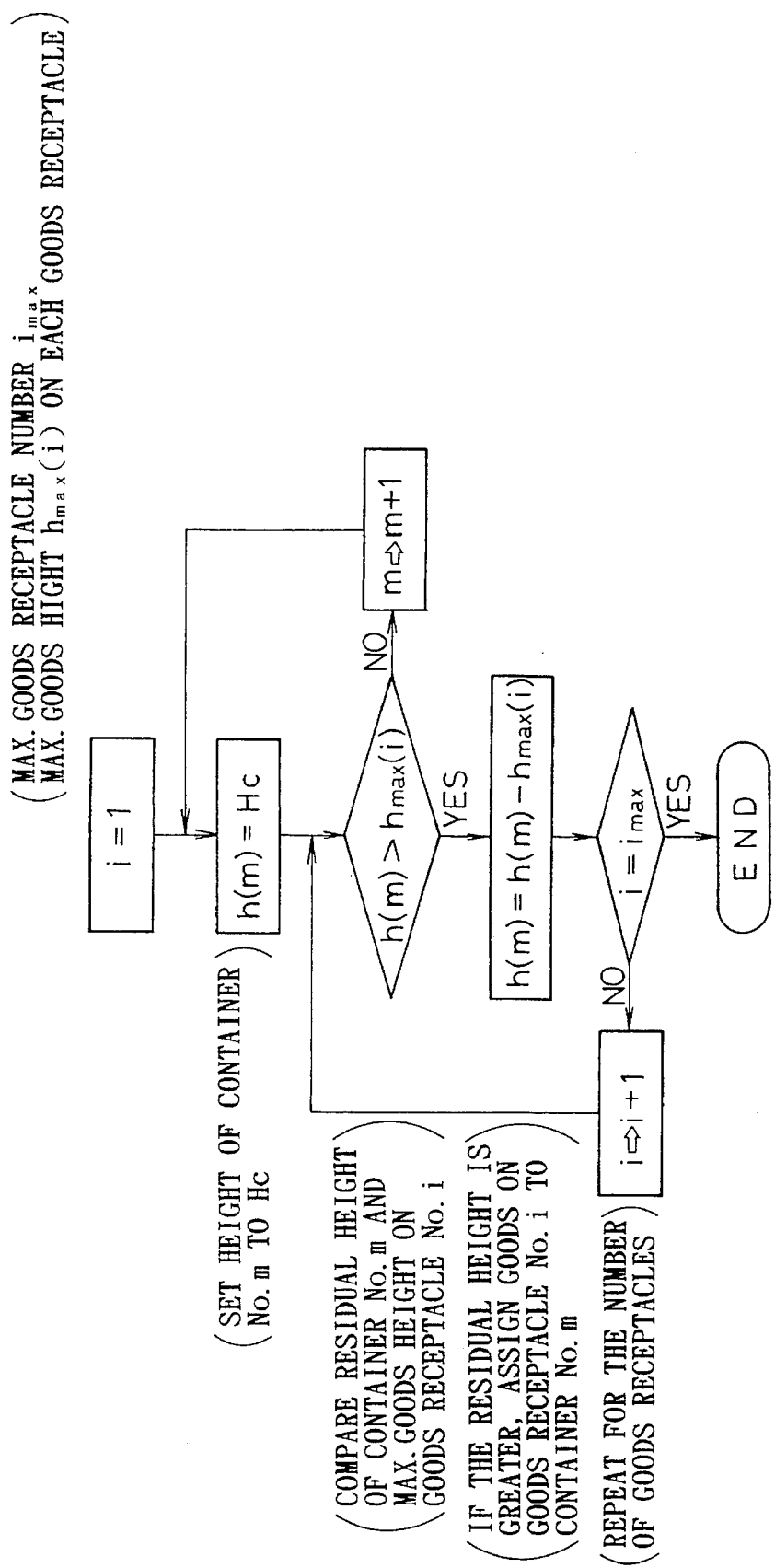
FIG. 13 is a flow chart of a routine for calculation concerning the assignment of containers to the individual customers.

(C) Calculation of the number of containers 17 to be assigned to customer No. k (FIG. 13)

(1) Calculation is made first with the first goods receptacle 34 (i= 1) among the goods receptacles 34 assigned in (B) and with the first container 17 (m=1).

(2) The height of the container 17 (No. m) is denoted by Hc.

(3) The remaining height h(m) of the container 17 (No. m) and the maximum height $h_{max}(i)$ of goods on goods receptacle 34 (No. i) stored in (3) in the illustration (B) are compared, and if the remaining height h(m) of the container 17 (No. m) is greater, the goods on the goods receptacle 34 (No. i) is assigned to the container 17 (No. m).

(4) The previous step is executed repeatedly for all the number $i_{max}$ of goods receptacles 34 used in customer No. k as stored in (4) in illustration (B).

(5) If it is found that unlike (3) the remaining height h(m) of the container 17 (No. m) is smaller, the goods on the pertinent goods receptacle 34 (No. i) is assigned to the next container 17 (No. m+1).

Now, the operation of goods collection in the goods collection apparatus 10 will be described.

(1) Step of collecting goods (FIGS. 6A and 6B)

(1) Each goods delivery unit 11 is given an instruction about the necessary quantity of goods as ordered by a delivery controller (computer) and, when a goods receptacle 34 on the goods reception conveyor 12 is stopped in front of its goods delivery table 26D, it delivers goods 1 in an arrangement of a row to the goods receptacle 34 (FIG. 6A).

(2) Goods 1 delivered from the delivery table 26D of the goods delivery unit 11 are received on the goods reception surface 35 of the goods receptacle 34, which is inclined downward from the goods reception side adjacent the delivery table 26D. The received goods 1 slide over the goods reception surface 35 strike and are stopped by the movable side wall 36 in the closed state while maintaining their state of arrangement in a row (FIG. 6B).

(3) The goods receptacle 34 is conveyed on the conveyor 12 to successively reach the front of other goods delivery units 11 to receive goods 1 of other kinds which are delivered likewise from the other goods delivery units 11. These goods 1 received on the goods reception surface 35 are caused to gather against the movable side wall 36 and are thus given a predetermined collection form (FIG. 6B).

(2) Step of transferring goods (FIGS. 7A and 7B)

When the goods receptacle 34 arrives at the goods delivery position at the end of the conveying line of the conveyor 12, the movable side wall 36 is opened and tilted to the same angle as the goods reception surface 35. Thus, the goods on the goods reception surface 35 slide onto the shutter member 44 of the shutter 13 having waited in the inclined state substantially at the same angle as the goods reception surface 35 to be stopped and received by the stopper 44A (FIGS. 7A and 7B).

The inclination angle of the goods reception surface 35 and shutter member 44 is preferably as large as possible in a range, in which goods 1 are not damaged when they strike the movable side wall 36 or stopper 44A. If the inclination angle of the goods reception surface 35 and shutter member 44 is small, goods 1 may tumble while they are sliding and thus get out of the collection form.

(3) Step of stacking goods (FIGS. 8A to 8C and FIGS. 9A to 9C)

Figure 8A:
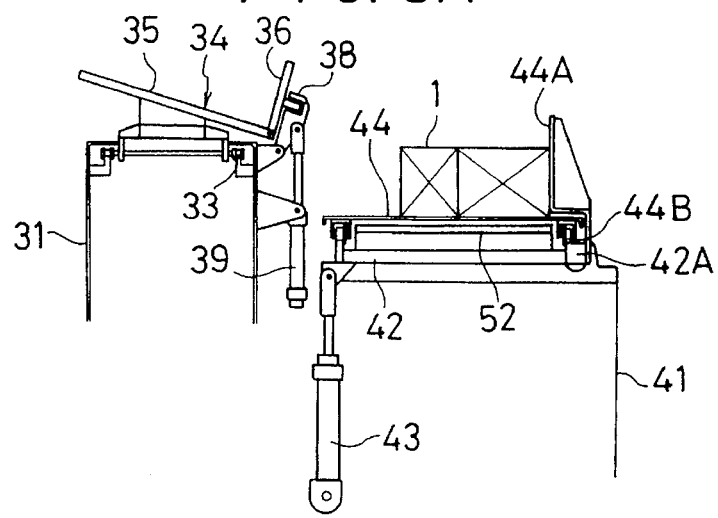
FIGS. 8A to 8C are views illustrating a step of transfer of first layer goods from the shutter to the table unit.
Figure 8B:
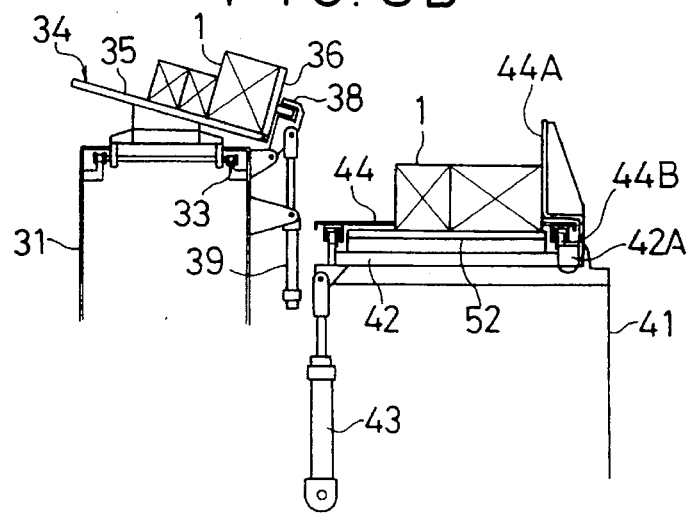

(1) In the shutter 13, after the shutter member 44 in the tilted position receives the goods 1 as described before, it is brought to the horizontal position and opened, whereby the goods 1 is transferred onto the stacking table 52 of the table unit 14 (FIGS. 8A and 8B).

At this time, the stacking table 52 is waiting in its upper set position free from interference with the lower surface of the shutter member 44.

Figure 8C:
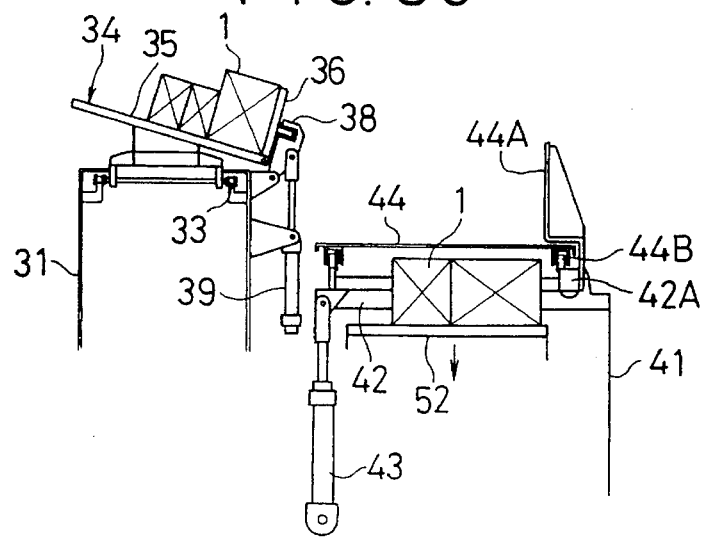

(2) The stacking table 52 is then lowered until the uppermost surface of the goods 1 on it is detected by the optical sensor 53 (FIG. 8C).

Figure 9A:
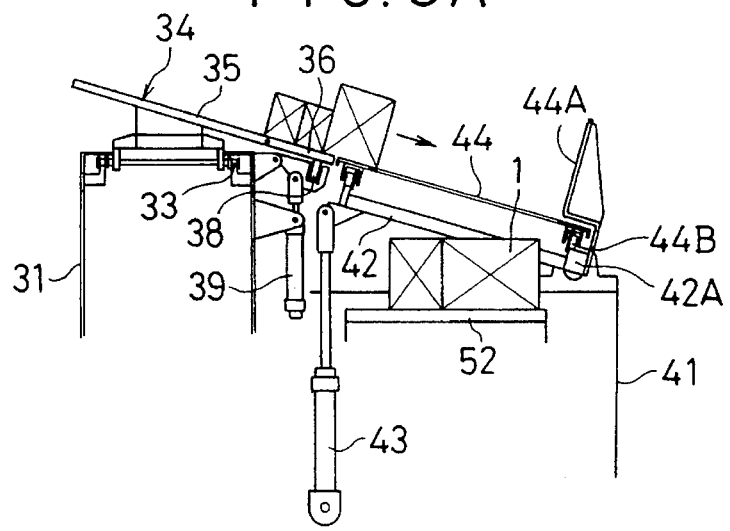
FIGS. 9A to 9C are views illustrating a step of transfer of second layer goods from the goods receptacle to the shutter and thence to the table unit.
Figure 9B:
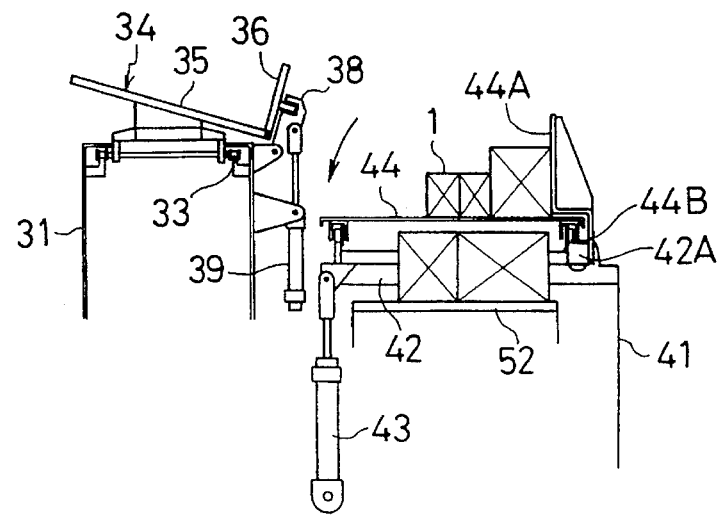
Figure 9C:
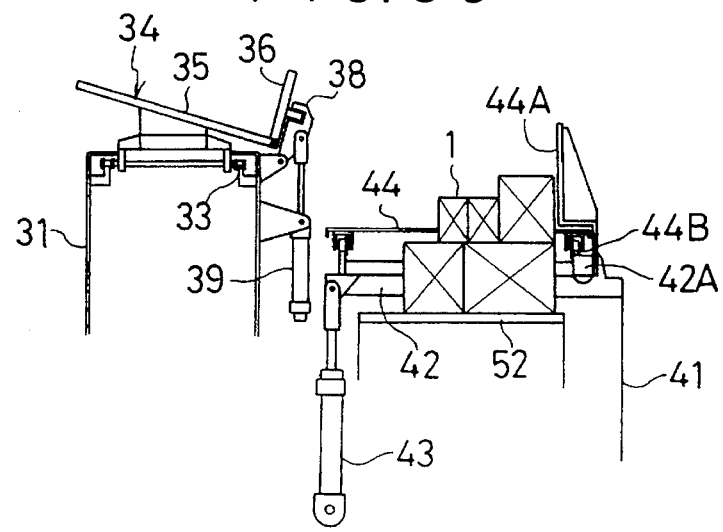

(3) The shutter member 44 is then closed and tilted again. In this way, the reception of goods on the shutter member 44 in (2) and the transfer of the goods onto the stacking table 52 in (3), (1) and (2) are repeatedly carried out, thus forming on the stacking table 52 a collection form of goods to be accommodated in the container 17 (FIGS. 9A to 9C).

The goods 1 on the goods receptacle 34 in FIGS. 8B and 8C form a second layer of stack on the stacking table 52.

The goods 1 stacked on the stacking table 52, either in the first layer or the second, have one side defined by the same stopper 44A. That is, the individual layers of goods 1 are aligned by the stopper 44A as the same reference of alignment, and thus the aligned surfaces of the upper and lower layers of goods 1 are flush with each other.

(4) Step of accommodating goods (FIG. 10)

(1) When a collection form of a predetermined number of vertical layers of goods is formed on the stacking table 52 of the table unit 14, the stacking table 52 is lowered to the lower set position as the level of accommodation of goods into the container 17. At this time, the collection form of the goods is not deformed because the stacking table 52 has its three sides enclosed by the collection form deformation prevention walls 56 to 58 and the pusher plate 54. On the side of the stacking table 52, on which an opening for delivering goods into the container 17 is formed and no collection form deformation prevention wall is provided, the goods are aligned accurately by the stopper 44A, and the aligned collection form is not easily deformed FIG. 10A).

Figure 10A:
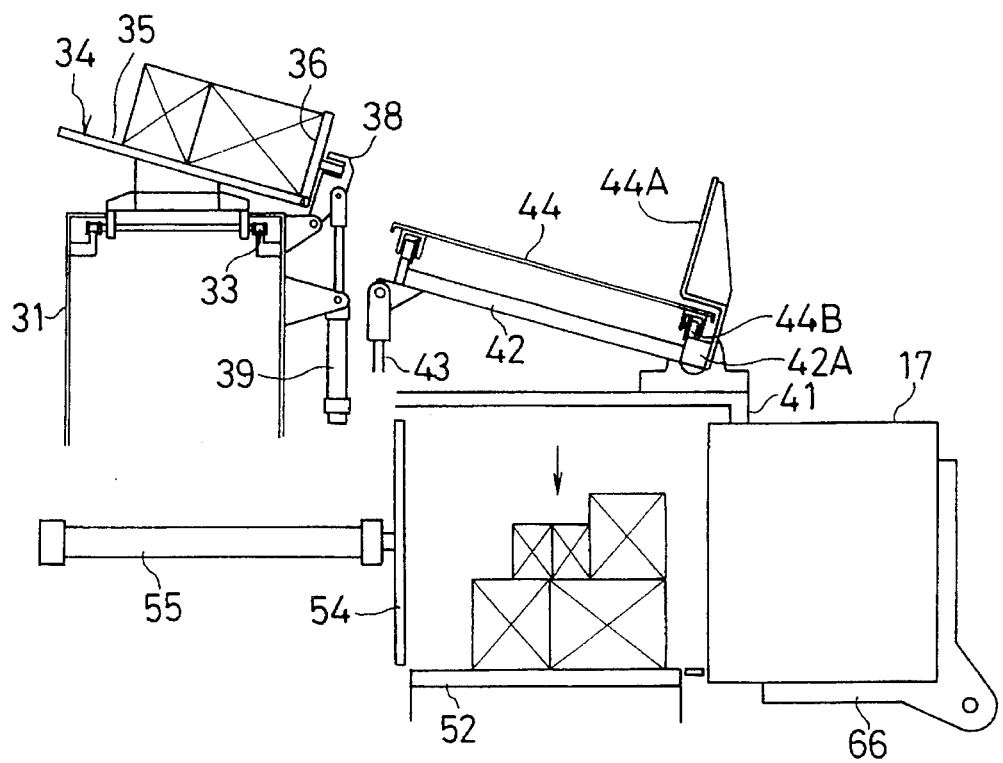
FIGS. 10A and 10B are views illustrating a step of transfer of goods from the table unit to a container.

(2) The container 17 is conveyed on the roller conveyor 62 of the container conveyor 15 and, when it arrives at the container turn-down position and comes to face the table unit 14, it is turned down by the container turn-down mechanism 65 horizontally such that its opening is directed toward the stacking table 52 and that its lowermost surface is set to the same level as the stacking table 52 (FIG. 10A).

Figure 10B:
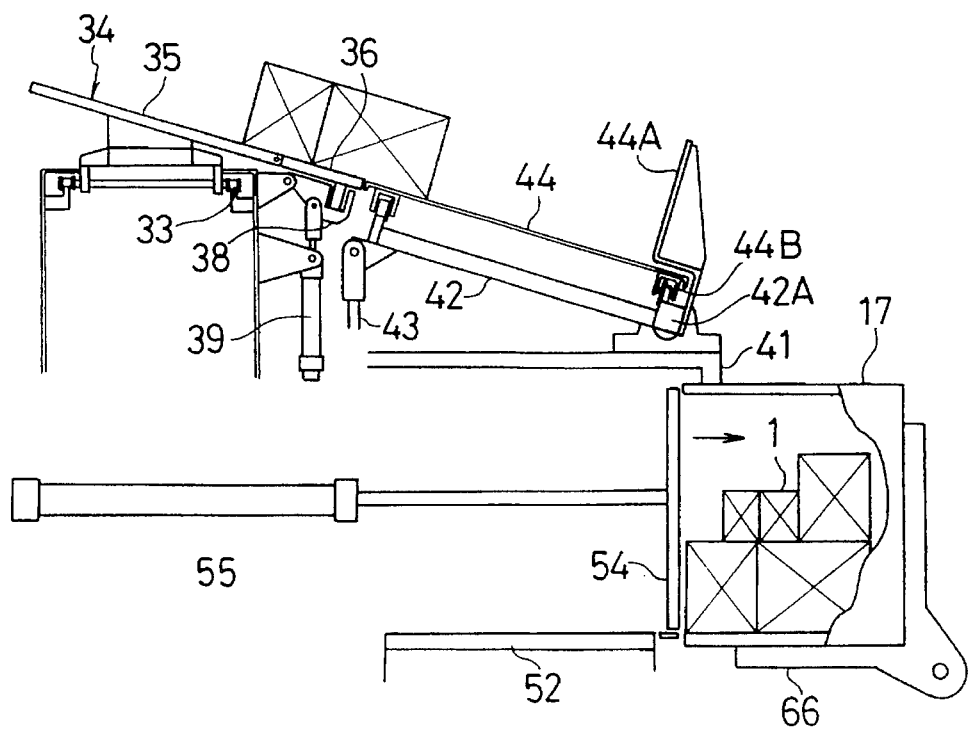

(3) Then, the goods in the collected form on the stacking container 52 are pushed by the pusher plate 54 into the container 17 and accommodated (FIG. 10B). Subsequently, the container 17 is returned by the container turn-down mechanism 65 onto the roller conveyor 62 and conveyed.

The functions of this embodiment will now be described.

(1) Goods 1A (or 1B) delivered from the goods delivery unit 11 and first transferred onto the goods receptacle 34, slide along the slope of the goods reception surface 35, and at the lower end of the inclined goods reception surface 35, they are received in a predetermined collection form with one side thereof defined by the movable side wall 36 in the closed state (FIGS. 15A and 15B).

Succeeding goods 1B (or 1C) also slide along the slope of the goods reception surface 35, and on the side of the lower end of the inclined goods reception surface 35, they are received in a predetermined collection form with one side thereof defined by the corresponding side of the goods 1A (or 1B) which have already been held stationary in the predetermined collection form as noted above (FIGS. 15B and 15C).

Thus, the successively transferred goods are stably collected such that they are allowed to gather on the side of the movable side wall 36. That is, it is possible to collect goods with high density on the goods reception surface in a predetermined collection form.

(2) When successively transferring goods 1 delivered from the goods delivery unit 11 onto two or more goods receptacles 34 and then accommodating the goods 1 on each goods receptacle 34 into a corresponding container 17, goods 1A and 1B, for instance, are highly densely collected on the first goods receptacle 34A in (1), and then goods 1C are highly densely collected on the second goods receptacle 34B in (1) (FIGS. 17A to 17C).

Subsequently, the movable side wall 36 of the first goods receptacle 34A is opened, whereby the goods 1A and 1B collected thereon in the predetermined collection form are transferred without deformation of the predetermined collection form from the inclined goods receptacle 35 onto the shutter member 44 with substantially the same slope of inclination. Thereafter, the shutter member 44 is brought to the horizontal position and then opened, whereby the goods 1A and 1B are transferred in the predetermined collection form onto the stacking table 52 (FIG. 17D).

Then, the movable side wall 36 of the second goods receptacle 34B is opened, whereby the goods 1C collected thereon in the predetermined collection form are transferred without deformation of the collection form from the inclined goods collection surface 35 onto the shutter member 44 with substantially the same slope of inclination. Thereafter, the shutter member 44 is brought to the horizontal position and then opened, whereby the goods 1C are transferred in the predetermined collection form onto and stacked on the goods 1A and 1B which have already been transferred onto the stacking table 52 (FIGS. 17D and 17E). At this time, the goods 1C can be stacked without deformation of the collection form on the goods 1A and 1B, because the lower goods 1A and 1B arrayed without intervening gap between adjacent ones of them.

The goods 1A to 1C which have thus been stacked on the stacking table 52, are pushed into and accommodated in the container 17 by the pusher plate 54 (FIG. 17E).

Thus, a plurality of different kinds of goods can be accommodated in a stacked state in the container without deformation of the predetermined collection form. In other words, they can be stacked highly density in the container.

(3) The movable side wall 36 of the goods receptacle 34 and the scraper 47 of the shutter 13 are disposed such as to stop and receive perpendicular sides of the goods 1. More specifically, when the goods 1 are received on the goods reception surface 35 of the goods receptacle 34, their Y direction position is regulated with one side of them defined by the movable side wall 36. Then, when the goods are subsequently delivered from the shutter member 44 of the shutter 13, their Y direction position is regulated with a different side of them pushed by the scraper 47. In consequence, the goods are delivered in a form aligned in both the X and Y directions to the side of the table unit 14.

(4) Box-like goods 1 which are delivered onto the goods receptacle 34 of the goods reception conveyor 12 slide along the slope of the goods reception surface 35, and at the lower end of the inclined goods reception surface 35, they are given a predetermined collection form with one side thereof defined by the wall 36 in the closed state before they are conveyed. At the goods delivery position, the wall 36 which is provided at the lower end of the inclined goods reception surface 35 is opened, whereby the goods 1 having been given the predetermined collection form noted above are delivered in orderly manner with the predetermined collection form as a delivery form to the next step. Thus, in the next step (for instance a step of transferring goods, a step of accommodating goods in containers, etc.), the goods can be handled satisfactorily.

While one embodiment of the invention has been described in detail with reference to the drawings, the described specific construction of the embodiment is by no means limitative, and design changes and modifications without departing from the scope of the invention are covered in the invention. For example, goods which are delivered from the goods reception surface with the opening of the movable side wall, may be tansferred without change in the orderly form onto an inclined shoot or the like for conveying them to the next step. Further, the movable side wall may not be mounted on the goods receptacle, but it may be disposed at a distance from and along the side of the goods receptacle.

As has been described in the foregoing, according to the invention, it is possible, when receiving goods on the goods receptacle and accommodating the received goods in the container, to collect the goods in a high density format on the goods reception surface in a predetermined collection form.

Further, according to the invention it is possible, when receiving goods on the goods receptacle and accommodating the received goods in containers or the like, to collect the goods in a high density format on the goods reception surface in a predetermined collection form and further accommodate the goods in a high density format in containers or the like.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above but to include all possible embodiments which can be embodied within a scope encompassed and equivalents thereof with respect to the feature set out in the appended claims.

TABLE 1

| Order contents (total customer number: K = 3) | | | | |
| --- | --- | --- | --- | --- |
| (k) | (f) | Name of Goods | Quantity (P) | Number of kinds ordered goods (F) |
| Customer No. 1 | ① | A | 3 | 2 |
| | ② | C | 8 | |
| Customer No. 2 | ① | B | 5 | 2 |
| | ② | C | 5 | |
| Customer No. 3 | ① | A | 6 | 3 |
| | ② | B | 8 | |
| | ③ | C | 6 | |

TABLE 2

| Assignment calcularion results | | | |
| --- | --- | --- | --- |
| k | Goods receptacle (i) | Assigned row (j) | Container (m) |
| Customer No. 1 | 1 | Goods A: 1 row (3) Goods C: 2 row (8) | 1 |
| Customer No. 2 | 1 | Goods B: 2 row (5) Goods C: 1 row (4) | 2 |
| | 2 | Goods C: 1 row (1) | |
| Customer No. 3 | 1 | Goods A: 1 row (4) Goods B: 1 row (4) | 3 |
| | 2 | Goods A: 1 row (2) Goods B: 1 row (4) | |
| | 3 | Goods C: 2 row (6) | 4 |

TABLE 3

| Specification of goods | | |
| --- | --- | --- |
| | Quantity (n) of one row | Depth (w) | Height (h) |
| Goods A | 4 | 160 | 155 |
| Goods B | 4 | 110 | 155 |

TABLE 3-continued

| Specification of goods | | |
| --- | --- | --- |
| | Quantity (n) of one row | Depth (w) | Height (h) |
| Goods C | 4 | 60 | 60 |

What is claimed is:

1. A goods collection method comprising steps of:

transporting a movable goods receptacle having a goods reception surface, along a front of a plurality of. aligned goods delivery units;

tentatively stopping the goods receptacle at the front of each goods delivery unit for successively receiving box-shaped goods of one kind or a plurality of different kinds delivered from the plurality of goods delivery units in predetermined quantities on the goods reception surface of the goods receptacle;

inclining the goods reception surface of the goods receptacle from a goods reception side toward an other side;

stopping goods received on the goods reception surface with a stopper wall provided on the other side of the goods reception surface; and causing the goods of one kind or a plurality of different kinds received on the goods receptacle to be collected on the goods reception surface adjacent the stopper wall in a densely packed arrangement.

2. A goods collection apparatus comprising a plurality of goods delivery units and a goods receptacle transportable along a front of the plurality of goods delivery units and tentatively stopped at the front of each goods delivery unit for successively receiving box-shaped goods of one kind or a plurality of different kinds delivered from a plurality of goods delivery units in predetermined quantities on the goods receptacle and loading these goods in a container, wherein the goods receptacle has a goods reception surface inclined downward from a goods reception side toward an other side and a stopper wall provided on the other side for stopping received goods of one kind or a plurality of different kinds.

3. A goods collection and packing method using a plurality of aligned goods delivery units and a goods receptacle transported along a front of the plurality of goods delivery units and tentatively stopped at the front of each goods delivery unit for successively receiving box-shaped goods of one kind or a plurality of different kinds delivered from the plurality of goods delivery units in predetermined quantities on the goods receptacle and loading the goods of one kind or a plurality of different kinds in a vertical stack of a plurality of stages in a container wherein the goods receptacle has a goods reception surface inclined downward from a goods reception side toward an other side and a movable side wall for opening and closing, a shutter disposed alongside the goods receptacle at a goods discharge position at the trailing end of a goods receptacle transport line and including a shutter member capable of position change between a tilted position, at which goods of one kind or a plurality of different kinds delivered from the goods receptacle are received, and a horizontal position, at which the goods are delivered, the shutter member being opened at the horizontal position to permit delivery of goods, and a table unit disposed beneath the shutter and including a stacking table for supporting goods delivered from the shutter, the stacking table capable of being raised and lowered to stack the goods earlier delivered from the shutter, the steps of the method comprising collecting the goods received on the goods receptacle onto the goods reception surface adjacent the closed, movable side wall;

opening the movable side wall of the goods receptacle to cause the goods on the goods reception surface to slide downward and be transferred to the shutter member;

providing the shutter member with substantially the same slope of inclination as the goods reception surface by setting the shutter member in the tilted position; and moving the shutter member of the shutter to the horizontal and opened position to permit delivery and stacking of goods received from the shutter member onto the stacking table of the table unit.

4. A goods collection and stacking apparatus comprising:

a plurality of aligned goods delivery units;

a goods receptacle transportable along a front of the plurality of goods delivery units and tentatively stopped at the front of each goods delivery unit for successively receiving box-shaped goods delivered from the plurality of goods delivery units in predetermined quantities on a goods receptacle the goods receptacle having a goods reception surface inclined downward from a goods reception side toward an other side and a movable side wall for opening and closing;

a shutter disposed alongside the goods receptacle at a goods discharge position at a trailing end of a goods receptacle transport line, the shutter including a shutter member movable between a tilted and closed position, at which goods delivered from the goods receptacle are received, and a horizontal and open position, at which the received goods are transported for delivery off the shutter; and a table unit disposed beneath the shutter and including a stacking table for supporting goods delivered from the shutter, the stacking table capable of being raised and lowered to stack goods delivered from the shutter on top of goods previously delivered to the stacking table.

5. The goods collection apparatus according to claim 4, wherein the shutter further includes a scraper for contacting goods disposed on and moved by the shutter member when the shutter member is opened, wherein the movable side wall of the goods receptacle and the scraper of the shutter collectively serve to align perpendicular sides of goods, respectively.

6. A goods reception conveyor for conveying quantities of box-shaped goods of one kind or a plurality of different kinds comprising:

a plurality of aligned goods delivery units;

a goods receptacle transportable along the plurality of goods delivery units and tentatively stopped at each goods delivery unit, the goods receptacle transportable to a goods discharge position at a trailing end of a goods receptacle transport line, the goods receptacle having an inclinable goods reception surface with a lower end side and a movable side wall capable of opening and closing on the lower end side in the direction of inclination of the goods reception surface.

* * * * *